(12) United States Patent
Jiang et al.

(10) Patent No.: US 11,758,265 B2
(45) Date of Patent: Sep. 12, 2023

(54) IMAGE PROCESSING METHOD AND MOBILE TERMINAL

(71) Applicant: Honor Device Co., Ltd., Guangdong (CN)

(72) Inventors: Dongsheng Jiang, Shenzhen (CN); Mingliang Du, Shenzhen (CN); Haojun Shi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/907,806

(22) PCT Filed: Mar. 3, 2021

(86) PCT No.: PCT/CN2021/078956
§ 371 (c)(1),
(2) Date: Aug. 29, 2022

(87) PCT Pub. No.: WO2021/175269
PCT Pub. Date: Sep. 10, 2021

(65) Prior Publication Data
US 2023/0094025 A1  Mar. 30, 2023

(30) Foreign Application Priority Data
Mar. 3, 2020 (CN) .......................... 202010138875.3

(51) Int. Cl.
*H04N 23/63* (2023.01)
*H04N 23/695* (2023.01)
*H04N 23/45* (2023.01)

(52) U.S. Cl.
CPC ........... *H04N 23/632* (2023.01); *H04N 23/45* (2023.01); *H04N 23/633* (2023.01); *H04N 23/695* (2023.01)

(58) Field of Classification Search
CPC .... H04N 23/632; H04N 23/45; H04N 23/633; H04N 23/695; H04N 23/631; H04N 23/69; H04N 23/90; H04N 23/62; H04N 23/951
See application file for complete search history.

(56) References Cited

U.S. PATENT DOCUMENTS 8,670,046 B2   3/2014  Ohba et al.
9,225,909 B1 *  12/2015  Chou ................... H04N 23/951
(Continued)

FOREIGN PATENT DOCUMENTS

CN   102356630 A   2/2012
CN   102668585 A   9/2012
(Continued)

OTHER PUBLICATIONS

EP/21765191.8, Search Report, dated Jun. 26, 2023.

*Primary Examiner* — Mekonnen D Dagnew
(74) *Attorney, Agent, or Firm* — Leydig, Voit & Mayer, Ltd.

(57) ABSTRACT

An image processing method, includes: detecting a first operation used to select a photographing mode; determining a current photographing mode based on the detected first operation; displaying a display interface used to select a field of view; detecting a second operation used to select options of at least two fields of view; determining at least two fields of view corresponding to the current photographing mode based on the detected second operation; detecting a third operation used for photographing; obtaining a plurality of images corresponding to the at least two fields of view based on the detected third operation; and synthesizing the plurality of images to form a first image, and displaying the first image. According to the image processing method provided
(Continued)

in this application, requirements of a large field of view and fine details can be considered.

12 Claims, 12 Drawing Sheets

(56) References Cited

U.S. PATENT DOCUMENTS

| | | | |
|---|---|---|---|
| 9,401,036 B2 | 7/2016 | Sun et al. | |
| 9,716,825 B1 | 7/2017 | Manzari et al. | |
| 9,912,860 B2 | 3/2018 | Manzari et al. | |
| 10,397,493 B2 | 8/2019 | Cao et al. | |
| 10,419,690 B2 | 9/2019 | Wang et al. | |
| 10,455,221 B2 | 10/2019 | Gronholm et al. | |
| 10,560,627 B2 | 2/2020 | Griffith et al. | |
| 10,721,404 B1* | 7/2020 | Battocchi | H04N 23/72 |
| 2013/0169835 A1 | 7/2013 | Zhang et al. | |
| 2014/0118569 A1 | 5/2014 | Griffith et al. | |
| 2014/0210949 A1 | 7/2014 | Berkovich et al. | |
| 2018/0096487 A1 | 4/2018 | Nash et al. | |
| 2019/0121216 A1 | 4/2019 | Shabtay et al. | |
| 2019/0253593 A1* | 8/2019 | Li | G06T 5/003 |
| 2019/0289201 A1 | 9/2019 | Nishimura et al. | |
| 2020/0103726 A1* | 4/2020 | Shabtay | H04N 23/61 |
| 2022/0159183 A1 | 5/2022 | Li et al. | |

FOREIGN PATENT DOCUMENTS

| | | |
|---|---|---|
| CN | 103188428 A | 7/2013 |
| CN | 104065859 A | 9/2014 |
| CN | 106101545 A | 11/2016 |
| CN | 106385541 A | 2/2017 |
| CN | 106791400 A | 5/2017 |
| CN | 107534724 A | 1/2018 |
| CN | 107852453 A | 3/2018 |
| CN | 207283679 U | 4/2018 |
| CN | 109155815 A | 1/2019 |
| CN | 110072070 A | 7/2019 |
| CN | 110099213 A | 8/2019 |
| CN | 110248081 A | 9/2019 |
| CN | 106101545 B | 10/2019 |
| CN | 110620873 A | 12/2019 |
| CN | 110769156 A | 2/2020 |
| CN | 111294517 A | 6/2020 |
| JP | 2011119995 A | 6/2011 |
| RU | 2505844 C2 | 1/2014 |
| RU | 2665872 C2 | 9/2018 |
| WO | 2013030699 A1 | 3/2013 |

* cited by examiner

IMAGE PROCESSING METHOD AND MOBILE TERMINAL

CROSS-REFERENCE TO RELATED APPLICATIONS

This application is a National Stage of International Application No. PCT/CN2021/078956, filed on Mar. 3, 2021, which claims priority to Chinese Patent Application No. 202010138875.3, filed on Mar. 3, 2020. All of the aforementioned patent applications are hereby incorporated by reference in their entireties.

TECHNICAL FIELD

This application relates to the field of communication technologies, and in particular, to an image processing method and a mobile terminal.

BACKGROUND

With continuous development of photographing technologies and widespread use of mobile terminals, a photographing function of the mobile terminals is increasingly favored. In addition, with enhancement of a zooming capability of a mobile phone camera, the user may photograph a scene at a longer distance, and the photographed scene may be not distorted. However, a larger focal length leads to a smaller FOV (field of view) of an image. Although a large focal length may bring an advantage of photographing a long-range scene, when zoom-in is performed for imaging, the field of view FOV for imaging will also decrease proportionally, so a final image can only be a fine image with a smaller field of view.

With emergence of a wide-angle lens, a photographing effect in a large FOV scenario is significantly improved, that is, and ultra-wide-angle photographing can be performed. However, in such imaging, the loss of details is relatively serious. Currently, a photographing mode of a mobile terminal cannot take into consideration requirements of a large FOV scenario and fine details. For a user, the need for both distant detail information and scene information with a large FOV in an image has become an urgent problem to be resolved. The same problem may also occur during post-processing of a photo. When a large FOV photo is zoomed in, details become more and more blurred. However, when a small FOV photo is zoomed out, because a field of view of the small FVO photo is relatively small, only a scene in the current photo can be seen, and a scene outside the photo cannot be seen.

SUMMARY

This application provides an image processing method and a mobile terminal. This application further provides a computer readable storage medium to provide a method for synthesizing photographed images, so as to take into consideration requirements of a large field of view and fine details of an image, and improve user satisfaction with the photographed image.

According to a first aspect, this application provides an image processing method, including:

detecting a first operation used to select a photographing mode;

determining a current photographing mode in response to the detected first operation;

displaying a display interface used to select a field of view, where the display interface includes an option of a field of view corresponding to at least one camera;

detecting a second operation used to select options of at least two fields of view;

determining at least two fields of view corresponding to the current photographing mode in response to the detected second operation, where the at least two fields of view are corresponding to one or more cameras;

detecting a third operation used for photographing;

obtaining a plurality of images corresponding to the at least two fields of view in response to the detected third operation, where each of the at least two fields of view is corresponding to at least one image; and synthesizing the plurality of images to form a first image, and displaying the first image.

In a possible implementation, before the detecting a first operation used to select a photographing mode, the method further includes: starting a first camera, and displaying a photographing preview interface captured by the first camera; where the displayed display interface used to select a field of view includes only a field of view corresponding to the first camera; or the displayed display interface used to select a field of view includes only a field of view corresponding to the first camera, and a field of view corresponding to another camera on a same side of the mobile terminal as the first camera; or on the displayed display interface used to select a field of view, an option of the field of view corresponding to the first camera is displayed in a prominent manner; or on the displayed display interface used to select a field of view, fields of view corresponding to a same camera are displayed in a same manner; or on the displayed display interface used to select a field of view, fields of view corresponding to cameras on a same side of the mobile terminal are displayed in a same manner; or on the displayed display interface used to select a field of view, a recommended combination of fields of view is displayed in a prominent manner.

The first camera may be the only camera on a side of the mobile terminal, or may be one of a plurality of cameras on a side of the mobile terminal. The camera may be a main camera of the mobile terminal. The photographing preview interface may be a viewfinder frame picture currently photographed by the first camera. The display interface used to select a field of view may be a menu display interface for a user to select a field of view. In addition, through recommendation in the foregoing prominent manner, convenience of selecting a field of view by the user may be improved, and efficiency of photographing by the user may also be improved.

In a possible implementation, after the starting a first camera, and displaying a photographing preview interface captured by the first camera, the method further includes:

detecting a fourth operation used to switch a camera; and starting a second camera in response to the detected fourth operation, and displaying a photographing preview interface captured by the second camera; and the displayed display interface used to select a field of view includes only a field of view corresponding to the second camera; or the displayed display interface used to select a field of view includes only a field of view corresponding to the second camera, and a field of view corresponding to another camera on a same side of the mobile terminal as the second camera; or on the displayed display interface used to select a field of view, an option of the field of view corresponding to the second camera is displayed in a prominent manner; or on the displayed display interface used to select a field of view, fields of view corresponding to a same second camera are displayed in a same manner; or on the displayed display interface used to select a field of view, fields of view corresponding to cameras on a same side of the mobile terminal are displayed in a same manner; or on the displayed display interface used to select a field of view, a recommended combination of fields of view is displayed in a prominent manner.

The second camera may be a camera that has a same function as the first camera, may be on the other side of the mobile terminal relative to the first camera, and may be the only camera on the other side, or may be on the other side of the mobile terminal relative to the first camera, and may be one of a plurality of cameras on the other side. It should be understood that, after the camera changes from the first camera to the second camera, a current photographing preview interface also changes with the camera; that is, in a first camera scenario, the photographing preview interface captured by the first camera is obtained, and in a second camera scenario, the photographing preview interface captured by the second camera is obtained. Similarly, after the camera is switched, a quantity of cameras may change. For example, there is only one front-facing camera at first, and after the camera is changed, the quantity of cameras changes to three. In this case, the display interface used to select a field of view also changes. By switching the camera in the foregoing manner, a degree of freedom of photographing by the user can be improved, an application scenario of the mobile terminal can be increased, and user experience can be improved.

In a possible implementation, the synthesizing the plurality of images includes:

sorting the plurality of images by field of view, and sequentially superposing each image. The superposition process may include zooming in, zooming out, cropping, filling, or overlaying an image. For example, in a process of superposing two images, either of the two images may be first zoomed out or zoomed in and then overlaid with the other image. In the overlaying process, a central part of a relatively large image may be overlaid by a relatively small image, or an edge part of a relatively large image may be filled with a relatively small image. By synthesizing the images in the foregoing manner, the requirements of a large field of view and fine details may be considered.

In a possible implementation, the sequentially superposing each image includes:

sequentially obtaining, in descending order of fields of view, a field of view ratio S of each image to an image Fmin corresponding to the smallest field of view;

keeping the image Fmin corresponding to the smallest field of view unchanged, and sequentially zooming in the remaining images based on the corresponding field of view ratio S to obtain a zoomed-in image; and sequentially superposing the image Fmin and all zoomed-in images in ascending order of fields of view.

By sorting each image and sequentially superposing each image in ascending order of fields of view, it is suitable for a scenario in which a large field of view and fine details are considered, thereby improving image synthesis efficiency.

In a possible implementation, the sequentially superposing each image includes:

sequentially obtaining, in descending order of fields of view, a field of view ratio S of an image Fmax corresponding to the largest field of view to each image;

keeping the image Fmax corresponding to the largest field of view unchanged, and sequentially zooming in the remaining images based on the corresponding field of view ratio S to obtain a zoomed-out image; and sequentially superposing the image Fax and all zoomed-out images in ascending order of fields of view.

By sorting each image and sequentially superposing each image in descending order of fields of view, it is suitable for a scenario in which a resolution and clear details are considered, thereby improving image synthesis efficiency.

In a possible implementation, the obtaining a plurality of images corresponding to the at least two fields of view includes: if the at least two fields of view are corresponding to a plurality of cameras, storing an original captured image corresponding to each camera; and the synthesizing the plurality of images includes: synthesizing the original captured image corresponding to each camera, and associating the synthesized image with the original captured image corresponding to each camera.

If the at least two fields of view are corresponding to a plurality of cameras, it means that each camera is corresponding to each field of view, that is, one field of view is corresponding to one camera. In a photographing process, one camera captures one original image based on a corresponding field of view, and the synthesized image (that is, the first image) is a synthesized image obtained after the original image of each camera is cropped and synthesized. After the first image is determined through synthesis, the resolution and the field of view are also determined. In the existing technology, if the first image is zoomed in or zoomed out, only the size of the first image is increased or decreased, and the resolution and the field of view of the first image remain unchanged. In associating the first image with a corresponding original captured image and storing the first image, when zoom-in or zoom-out is performed later, a corresponding original captured image may be invoked to adaptively adjust a field of view and a resolution, thereby meeting the user's requirements for ensuring the field of view and resolution when performing zoom-in or zoom-out and improving user experience.

In a possible implementation, after the displaying the synthesized image, the method further includes:

detecting a fifth operation used for zooming;

determining a current zoom mode and a current zoom ratio in response to the detected fifth operation, where the zoom mode includes a first zoom mode and a second zoom mode; and if the current zoom mode is the first zoom mode, obtaining all original captured images corresponding to the synthesized image, zooming the original images based on the current zoom ratio, to form a second image, and displaying the second image; or if the current zoom mode is the second zoom mode, obtaining a maximum of two original captured images corresponding to the synthesized image, zooming the original images based on the current zoom ratio, to form a second image, and displaying the second image.

The fifth operation may be used after synthesis of the first image, and may be further used for post-processing, where the post-processing may include zoom-in and zoom-out. The first zoom mode may be zoom-out, and a zoom-out ratio may be between 0.33 and 1. The zoom-out mode may change a field of view, but does not change a size of an image, or may change both a field of view and a size of an image. When the image is zoomed out, the image may be the first image. Because the first image is associated with an original captured image of a corresponding camera, original captured images of all corresponding cameras may be invoked. For example, generally, the original captured images include one wide-angle original captured image, one standard original captured image, and one long-focus original captured image. After being zoomed out based on a current zoom-out ratio, the foregoing three original captured images are synthesized again to obtain a final zoomed-out image (that is, the second image), and the second image is displayed, thereby enlarging a field of view while reducing the size of the image.

In addition, the second zoom mode may be zoom-in, and the zoom-in ratio may be between 1 and 3.33, or may be greater than 3.33. If the zoom-in ratio is between 1 and 3.33, two original captured images corresponding to the preview image may be invoked, for example, one standard original captured image and one long-focus original captured image. After the two original captured images are cropped and synthesized, a final zoomed-in image (that is, the second image) may be obtained, and the second image is displayed. If the zoom-in ratio is greater than 3.33, a wide-angle original captured image may be invoked, the wide-angle original captured image is zoomed in through upsampling, and then cropping is performed to obtain a final zoomed-in image, and the second image is displayed, thereby ensuring that the image is clear while increasing the size of the image.

According to a second aspect, this application provides a mobile terminal, including:

a memory, where the memory is configured to store computer program code, the computer program code includes an instruction, and when the mobile terminal reads the instruction from the memory, the mobile terminal is enabled to perform the following steps: detecting a first operation used to select a photographing mode;

determining a current photographing mode in response to the detected first operation;

displaying a display interface used to select a field of view, where the display interface includes an option of a field of view corresponding to at least one camera;

detecting a second operation used to select options of at least two fields of view;

determining at least two fields of view corresponding to the current photographing mode in response to the detected second operation, where the at least two fields of view are corresponding to one or more cameras;

detecting a third operation used for photographing;

obtaining a plurality of images corresponding to the at least two fields of view in response to the detected third operation, where each of the at least two fields of view is corresponding to at least one image; and synthesizing the plurality of images to form a first image, and displaying the first image.

In a possible implementation, when the instruction is executed by the mobile terminal, before the mobile terminal performs the step of detecting the first operation used to select the photographing mode, the following step is further performed:

starting a first camera, and displaying a photographing preview interface captured by the first camera; where the displayed display interface used to select a field of view includes only a field of view corresponding to the first camera; or the displayed display interface used to select a field of view includes only a field of view angle corresponding to the first camera, and a field of view angle corresponding to another camera on a same side of the mobile terminal as the second camera; or on the displayed display interface used to select a field of view, an option of the field of view corresponding to the first camera is displayed in a prominent manner; or on the displayed display interface used to select a field of view, fields of view corresponding to a same camera are displayed in a same manner; or on the displayed display interface used to select a field of view, fields of view corresponding to cameras on a same side of the mobile terminal are displayed in a same manner; or on the displayed display interface used to select a field of view, a recommended combination of fields of view is displayed in a prominent manner.

In a possible implementation, when the instruction is executed by the mobile terminal, the mobile terminal is enabled to perform the following steps after performing the step of starting the first camera and displaying the photographing preview interface captured by the first camera:

detecting a fourth operation used to switch a camera; and starting a second camera in response to the detected fourth operation, and displaying a photographing preview interface captured by the second camera; and the displayed display interface used to select a field of view includes only a field of view corresponding to the second camera; or the displayed display interface used to select a field of view includes only a field of view corresponding to the second camera, and a field of view corresponding to another camera on a same side of the mobile terminal as the second camera; or on the displayed display interface used to select a field of view, an option of the field of view corresponding to the second camera is displayed in a prominent manner; or on the displayed display interface used to select a field of view, fields of view corresponding to a same second camera are displayed in a same manner; or on the displayed display interface used to select a field of view, fields of view corresponding to cameras on a same side of the mobile terminal are displayed in a same manner; or on the displayed display interface used to select a field of view, a recommended combination of fields of view is displayed in a prominent manner.

In a possible implementation, when the instruction is executed by the mobile terminal, that the mobile terminal is enabled to perform the step of synthesizing the plurality of images includes:

sorting the plurality of images by field of view, and sequentially superposing each image.

In a possible implementation, when the instruction is executed by the mobile terminal, that the mobile terminal is enabled to perform the step of sequentially superposing each image includes:

sequentially obtaining, in descending order of fields of view, a field of view ratio S of each image to an image Fmin corresponding to the smallest field of view;

keeping the image Fmin corresponding to the smallest field of view unchanged, and sequentially zooming in the remaining images based on the corresponding field of view ratio S to obtain a zoomed-in image; and sequentially superposing the image Fmin and all zoomed-in images in ascending order of fields of view.

In a possible implementation, when the instruction is executed by the mobile terminal, that the mobile terminal is enabled to perform the step of sequentially superposing each image includes:

sequentially obtaining, in descending order of fields of view, a field of view ratio S of an image Fmax corresponding to the largest field of view to each image;

keeping the image Fmax corresponding to the largest field of view unchanged, and sequentially zooming in the remaining images based on the corresponding field of view ratio S to obtain a zoomed-out image; and sequentially superposing the image Fax and all zoomed-out images in ascending order of fields of view.

In a possible implementation, when the instruction is executed by the mobile terminal, that the mobile terminal is enabled to perform the step of obtaining a plurality of images corresponding to the at least two fields of view includes:

if the at least two fields of view are corresponding to a plurality of cameras, storing an original captured image corresponding to each camera; and the synthesizing the plurality of images includes: synthesizing the original captured image corresponding to each camera, and associating the synthesized image with the original captured image corresponding to each camera.

In a possible implementation, when the instruction is executed by the mobile terminal, after that the mobile terminal is enabled to perform the step of displaying the synthesized image, the following step is further performed:

detecting a fifth operation used for zooming;

determining a current zoom mode and a current zoom ratio in response to the detected fifth operation, where the zoom mode includes a first zoom mode and a second zoom mode; and if the current zoom mode is the first zoom mode, obtaining all original captured images corresponding to the synthesized image, zooming the original images based on the current zoom ratio, to form a second image, and displaying the second image; or if the current zoom mode is the second zoom mode, obtaining a maximum of two original captured images corresponding to the synthesized image, zooming the original images based on the current zoom ratio, to form a second image, and displaying the second image.

According to a third aspect, this application provides a computer readable storage medium, where the computer readable storage medium stores a computer program, and when the computer program is run on a computer, the computer is enabled to perform the method according to the first aspect.

According to a fourth aspect, this application provides a computer program, where when the computer program is executed by a computer, the computer program is used to perform the method according to the first aspect.

In a possible design, the program in the fourth aspect may be completely or partially stored in a storage medium that is packaged with the processor, or may be partially or completely stored in a memory that is not packaged with the processor.

DESCRIPTION OF EMBODIMENTS

Figure 1:
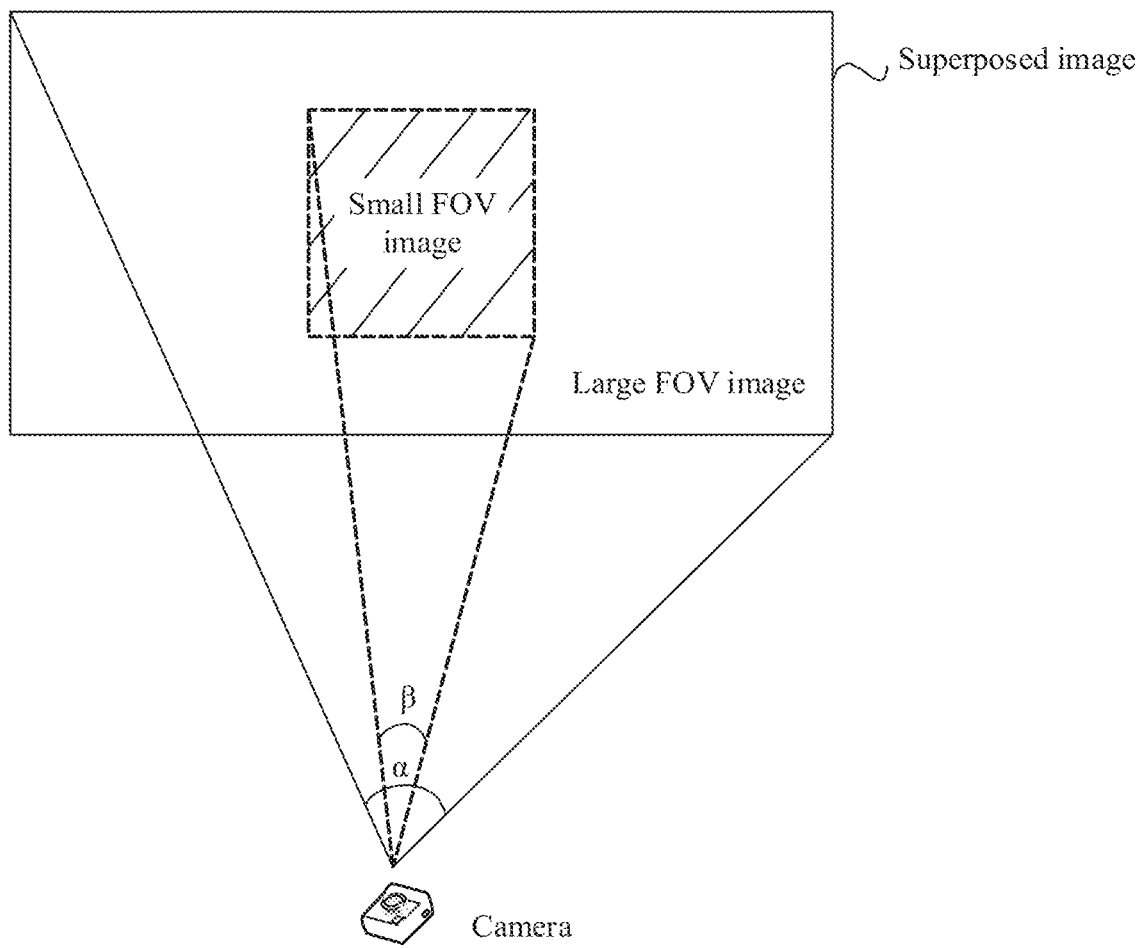
FIG. 1 is a schematic diagram of image superposition according to an embodiment of this application.

The following describes technical solutions in the embodiments of this application with reference to the accompanying drawings in the embodiments of this application. In the description of embodiments of this application, unless otherwise specified, "/" means "or", for example, A/B may mean "A or B"; "and/or" used herein is only used to describe an association relationship between associated objects, and indicates that three relationships may exist. For example, A and/or B may indicate the following: Only A exists, both A and B exist, and only B exists.

The terms "first" and "second" are used herein for description only, and cannot be understood as indicating or implying relative importance or implicitly indicating the quantity of indicated technical features. Therefore, the features defined with "first" and "second" can explicitly or implicitly include one or more of the features. In the description of the embodiments of this application, unless otherwise specified, "a plurality of" means two or more.

At present, a mobile terminal generally includes a camera, and with enhancement of a zooming capability of the camera, a user can photograph details at a long distance without loss. However, when zoom-in is performed for imaging, the field of view FOV for imaging will also decrease proportionally, and the user can only see a fine image with a smaller field of view. With the introduction of a wide-angle lens, a photographing effect in a large FOV scenario is significantly improved, that is, and ultra-wide-angle photographing can be performed. However, photographing in this manner also has the following problem: The loss of details is relatively serious. When a first picture obtained through photographing in a large field-of-view scenario is performed, a larger FOV leads to more blurred details; when a second image is photographed after zoom-out is performed, the FOV becomes smaller, and details becomes clearer.

The same problem also occurs during post-processing of a photographed photo. When the photographed photo is zoomed in, details become blurred. When the photographing photo is zoomed out, because a size of the photo is reduced, a field of view does not change, and therefore, information outside the current photo cannot be obtained. Similarly, after a screenshot of a captured photo is taken, if an area of the screenshot is zoomed in, it will be blurred when displayed.

It should be noted that the field of view is used to indicate the largest angle range that can be photographed by the camera in a process of photographing an image. If a to-be-photographed object is within the angle range, the to-be-photographed object is captured by a camera and then presented in a preview image. If the to-be-photographed object is outside the angle range, the to-be-photographed object will not be captured by the image capturing apparatus, that is, will not presented in the preview image. Generally, a larger field of view of the camera indicates a larger photographing range and a shorter focal length; and a smaller field of view of the camera indicates a smaller photographing range and a longer focal length.

Generally, the field of view includes a range in a horizontal direction and a range in a vertical direction. In this application, two fields of view may be used to respectively represent the range in the horizontal direction and the range in the vertical direction, or one field of view may be used to represent both a range in the horizontal direction and a range in the vertical direction. For ease of description, the following uses an example in which one field of view represents both a range in the horizontal direction and a range in the vertical direction for description. For example, as shown in FIG. 1, a field of view a is an angle corresponding to diagonal lines of two edges of an image that is captured by using a camera with a large field of view, and may represent both an angle in the horizontal direction and an angle in the vertical direction. R is an angle corresponding to diagonal lines of two edges of an image that is captured by a camera with a small field of view, and may represent both an angle in the horizontal direction and an angle in the vertical direction.

In this application, the "field of view" may also be referred to as a term such as "viewing range". The name of the field of view is not limited in this specification, provided that the foregoing concept is expressed.

Then, an image with the large field of view and the image with the small field of view are synthesized to obtain a synthesized image. In this case, the field of view of the displayed image is large, and a picture with a relatively high resolution may be presented in detail, to meet a requirement for improving detail quality of the user in a large field-of-view scenario, thereby improving imaging quality of the photo and improving user experience.

The technical solution provided in this embodiment of this application may be applied to a mobile terminal. A specific form of the mobile terminal that executes the technical solution is not specifically limited in this application.

Figure 2:
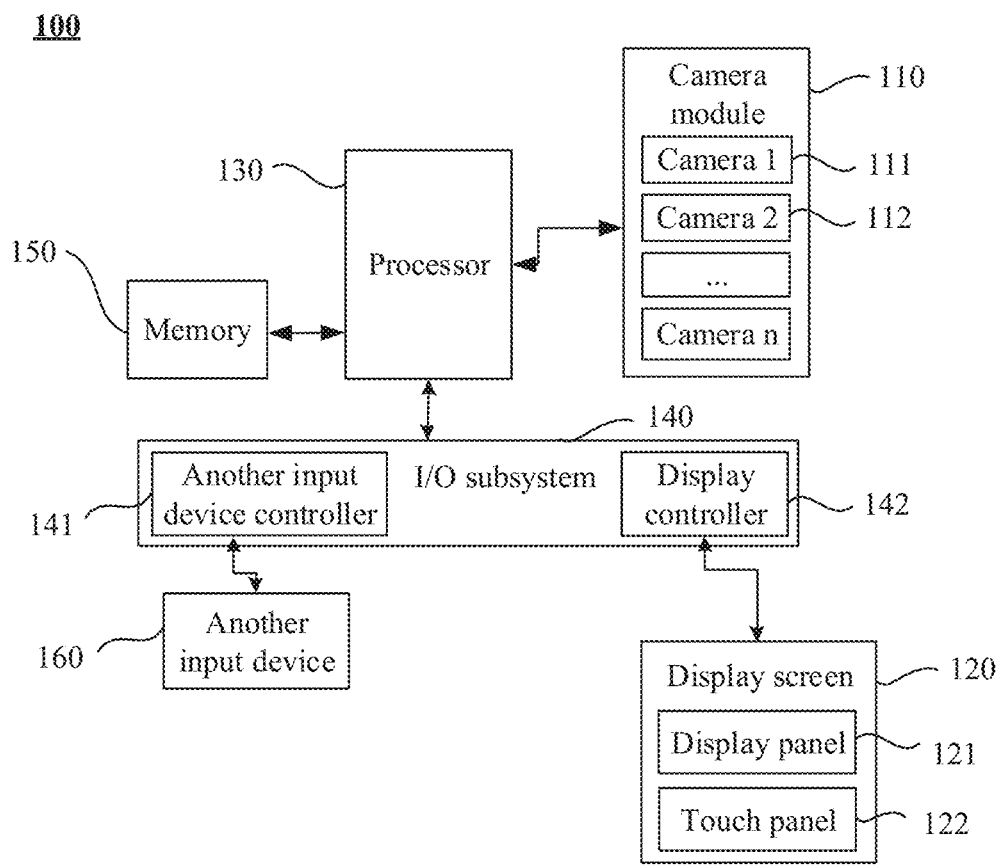
FIG. 2 is a schematic diagram of a structure of a mobile terminal according to an embodiment of this application.

FIG. 2 is a schematic diagram of a structure of a mobile terminal 100 according to an embodiment of this application. The mobile terminal includes a camera module 110, a display screen 120, a processor 130, an I/O subsystem 140, a memory 150, and another input device 160. The camera module 110 is configured to capture an image, and the display screen 120 is configured to display an image and an operation interface.

The camera module 110 includes at least one camera 111. If the camera module includes only one camera, the camera is a zoom camera, and the zoom camera may be front-facing or rear-facing. If the camera module includes two cameras and the two cameras are respectively on two sides of the mobile terminal, at least one camera is a zoom camera; and if the two cameras are on a same side of the mobile terminal, the two cameras may be any combination of zoom or fixed-focus cameras. If the camera module includes more than two cameras, at least two cameras are on a same side of the mobile terminal, that is, the camera module includes at least two front-facing cameras or at least two rear-facing cameras, and the cameras on the same side may be any combination of zooming or zooming cameras. The zoom camera may perform photographing successively by using a plurality of fields of view set by the user, so as to obtain an image corresponding to each field of view. In a photographing process, a photographing time interval between two images should be shortened as much as possible, so as to ensure consistency of exposure parameters used for photographing each time, so as to obtain an image whose exposure parameters are consistent. The photographing time interval is determined by a setting of hardware or a user, that is, the photographing time interval is determined by a specification parameter of the camera. For example, the user may select a parameter of continuous exposure, and the parameter may include a time interval of continuous exposure. If the camera module includes two or more fixed-focus cameras, the plurality of fixed-focus cameras include at least one fixed-focus camera with a large field of view and at least one fixed-focus camera with a small field of view. The at least one camera with a large field of view (for example, the field of view is between 100 degrees and 200 degrees, and a resolution is between a video graphics array (VGA) and 720p) may be, for example, a camera 111; and the at least one camera with a small field of view (for example, the field of view is between 20 degrees and 60 degrees, and the resolution is between 720p and 2 Kp) may be, for example, a camera 112. An image captured by the camera with a large field of view has a large field of view and a low resolution. An image captured by the camera with a small field of view has a small field of view and a high resolution. At least two fixed-focus cameras may capture images at the same time. It should be understood that all fixed-focus cameras may change a focal length through digital zooming, and a range of digital zooming is related to a specific fixed-focus camera.

The display screen 120 may be configured to display information input by a user or information provided for the user, and various menus of the mobile terminal 100, and may receive a user input. A specific display screen 120 may include a display panel 121 and a touch panel 122. The display panel 121 may be configured in the form of a liquid crystal display (LCD), an organic light-emitting diode (OLED), or the like. The touch panel 122, also referred to as a touch screen, a touch-sensitive screen, or the like, can collect a user's contact or non-contact operations on or near the touch panel 122 (such as an operation performed on or near the touch panel 122 by the user by using any suitable object or accessory such as a finger or a stylus), or a somatosensory operation; the operation includes operation types such as a single-point control operation, a multi-point control operation, or the like), and can drive a corresponding connected device based on a preset program. Optionally, the touch panel 122 may include two parts: a touch detection apparatus and a touch controller. The touch detection apparatus detects a touch position and a touch gesture of the user, detects a signal from a touch operation, and transmits the signal to the touch controller. The touch controller receives touch information from the touch detection apparatus, converts the touch information into information that can be processed by the processor, then sends the information to the processor 130, and can receive and execute commands sent from the processor 130. In addition, the touch panel 122 may be implemented by using a plurality of types, such as a resistive type, a capacitive type, an infrared type, and a surface acoustic wave; or the touch panel 122 may be implemented by using any technology developed in the future. Further, the touch panel 122 may cover the display panel 121. The user may perform an operation on or near the touch panel 122 covered on the display panel 121 based on content displayed on the display panel 121 (the display content includes but is not limited to a soft keyboard, a virtual mouse, a virtual key, and an icon). After detecting the operation on or near the touch panel 122, the touch panel 122 sends the operation to the processor 130 by using the I/O subsystem 140 to determine a user input, and then the processor 130 provides a corresponding visual output on the display panel 121 based on the user input by using the I/O subsystem 140. Though in FIG. 3, the touch panel 122 and the display panel 121 implement input and output functions of the mobile terminal 100 as two separate components, in some embodiments, the touch panel 122 may be integrated with the display panel 121 to implement the input and output functions of the mobile terminal 100.

As a control center of the mobile terminal 100, the processor 130 is connected to parts of the mobile terminal by various interfaces and lines to perform functions and process data of the mobile terminal 100 by running or executing the software program and/or the module stored in the memory 150, and invoking data stored in the memory 150, so as to monitor the mobile terminal as a whole. Optionally, the processor 130 may include one or more processing units; and preferably, the processor 130 may be integrated into an application processor and a modem processor. The application processor is mainly configured to process an operating systems, a user interface, and an application. The modem processor is mainly configured to process wireless communication. It may be understood that the modem processor may alternatively not be integrated into the processor 130.

The I/O subsystem 140 is configured to control an external input/output device, and may include another device input controller 141 and a display controller 142. Optionally, the one or more other input control device controllers 141 receive signals from the another input device 140 and/or send signals to the another input device 140. The another input device 140 may include a physical button (a push button, a rocker button, or the like), a dial pad, a slider switch, a joystick, a click wheel, and an optical mouse (the optical mouse is a touch-sensitive surface that does not display a visual output, or an extension of a touch-sensitive surface formed by a touchscreen). It should be noted that each of the other input control device controllers 141 may be connected to any one or more of the foregoing devices. The display controller 142 in the I/O subsystem 140 receives signals from the display screen 120 and/or sends signals to the display screen 120. After the display screen 120 detects a user input, the display controller 142 converts the detected user input into interaction with a user interface object displayed on the display screen 120, that is, implements human-computer interaction.

The memory 150 may be configured to store a software program and a module, and the processor 130 executes various function applications and data processing of the mobile terminal 100 by running the software program and the module stored in the memory 150. The memory 150 may primarily include a program storage area and a data storage area. The program storage area may store an operating system, an application required by at least one function (for example, a sound playback function and an image playback function), and the like. The data storage area may store data (for example, audio data and a phone book) created based on use of the mobile terminal 100, and the like. In addition, the memory 150 may include a high-speed random access memory, and may further include a non-volatile memory, such as at least one magnetic disk storage device, a flash memory device, or another volatile solid-state storage device.

The another input device 160 may be configured to receive entered digit or character information, and generate a key signal input related to user settings and function control of the mobile terminal 100. Specifically, the another input device 160 may include but is not limited to one or more of a physical keyboard, a function key (such as a volume control key or a power on/off key), a trackball, a mouse, a joystick, an optical mouse (an optical mouse is a touch-sensitive surface that does not display a visual output, or an extension of a touch-sensitive surface formed by a touchscreen), or the like. The another input device 160 is connected to the another input device controller 141 of the I/O subsystem 140, and performs signal interaction with the processor 130 under control of the another device input controller 141.

In this application, an image captured with a large field of view has a larger field of view, which can provide a wider viewing angle as a background image. However, an image captured by a small field-of-view camera has a relatively high image resolution, which may provide a user with an image with fine details. It can be learned that, in this application, the image captured with a large field of view and the image captured with a small field of view are synthesized, so as to meet a requirement for improving detail quality of the user in a large field-of-view scenario, thereby improving imaging quality of the photo and improving user experience.

It should be noted that, when the camera module includes a plurality of cameras, the plurality of cameras may be randomly disposed. For example, a camera 111 may be located on a left side or a right side of a camera 112, or the camera 111 may be located on an upper side or a lower side of the camera 112. That is, in this application, a relative position relationship between any camera in the camera module and another camera in the camera module is not limited.

In this way, the plurality of images captured by the cameras in the camera module 110 are displayed on the display screen 120 after being processed by using the method provided in this application, so as to meet a photographing requirement of the user on the image. Generally, whether the mobile terminal includes only one camera or a plurality of cameras, a plurality of images may be obtained by photographing, where exposure parameters corresponding to the plurality of images may be the same, and the exposure parameters include a focus, an exposure time, and a sensitivity.

The image processing method provided in this application is described with reference to FIG. 3 to FIG. 11. The method may be applied to the foregoing mobile terminal 100.

Step s1: In response to a detected photographing operation, one or more cameras capture a plurality of images, where each image is corresponding to a different target field of view.

Optionally, before step s1, the mobile terminal may display the current operation interface to the user by using a display based on the detected camera start instruction entered by the user. In specific implementation, the user may click an icon corresponding to a camera application in the display screen to start the camera for photographing. Correspondingly, after starting the camera of the mobile terminal, the user may preview, on a display interface of the mobile terminal, an image obtained in real time by the camera.

It should be understood that, to start an application by clicking an icon, the user may click or double-click the icon or operate the icon in another manner. This is not limited in this embodiment of this application.

Figure 3:
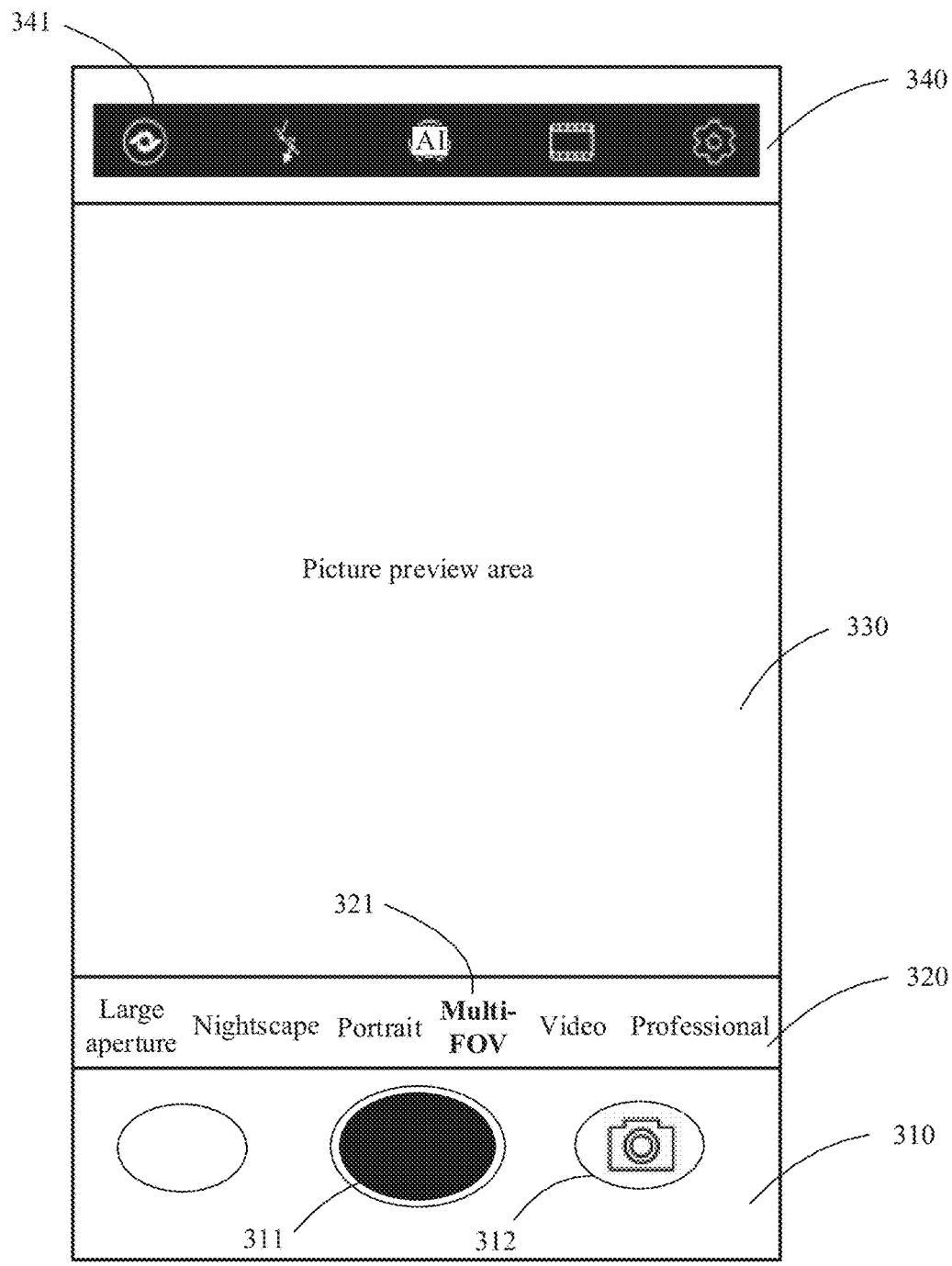
FIG. 3 is a schematic diagram of a display interface used for photographing according to an embodiment of this application.

In a possible implementation, after the camera is started, a display interface shown in FIG. 3 may be seen. Referring to FIG. 3, the display interface 300 of the mobile terminal includes a photographing operation area 310, a photographing mode selection area 320, a picture preview area 330, and a mode parameter setting area 340. The photographing mode selection area 320 includes a plurality of photographing mode options 321, for example, large aperture, night scene, photo, multi-FOV, video, and professional mode. The photographing operation area 310 includes a photographing button 311 and a camera switching button 312. It should be noted that a mobile terminal with a single camera does not have a camera switching function and therefore has no camera switching button 312. When the mobile terminal includes a plurality of cameras and the cameras are located on both sides of the mobile terminal, the mobile terminal has the camera switching function and may include the camera switching button 312.

Figure 4:
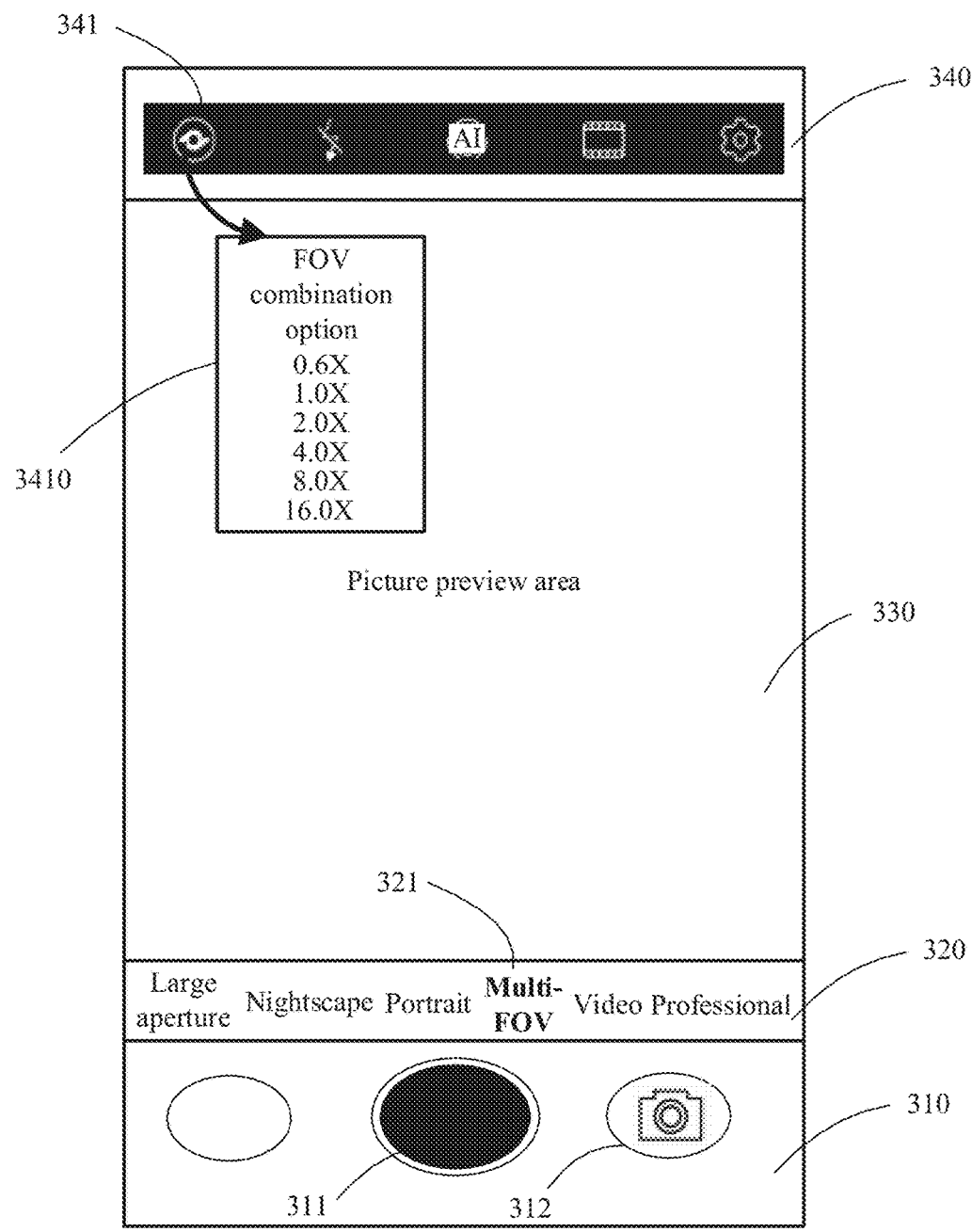
FIG. 4 is a schematic diagram of a display interface used for selecting an FOV combination according to an embodiment of this application.

Specifically, if the mobile terminal includes a plurality of cameras and the cameras are located on two sides of the mobile terminal, current cameras may be selected by clicking the camera switching button 312 in the photographing operation area 310, that is, front-facing cameras or rear-facing cameras may be selected. In the currently selected cameras, if at least one camera has a multi-FOV photographing function, the multi-FOV option appears in the options 321 in the photographing mode selection area 320. If the mobile terminal includes only one camera, in this case, there is no need to switch the camera. If the current camera supports the multi-FOV photographing function, the multi-FOV option appears in the options 321 in the photographing mode selection area 320; otherwise, the multi-FOV option does not appear. After the FOV option is clicked, a corresponding mode parameter option 341, such as a flash, an FOV combination option, and some other exposure parameter options, appears in the mode parameter setting area 340. After the FOV combination option in the mode parameter option 341 is clicked, an FOV combination option area 3410 is displayed on the current interface for the user to select, as shown in FIG. 4. The user may select options in the FOV combination option area 3410 to determine a currently required FOV combination. The selected option may be presented in a manner such as a tick or a color change. This is not limited in this embodiment.

It should be noted that, after the camera is switched, a current photographing preview interface may be obtained by using the switched camera, and a corresponding display interface of the selected field of view is also associated with the switched camera. For example, a primary camera in the front-facing cameras captures and displays a photographing preview picture. After the camera is switched, the primary camera in the rear-facing cameras captures and displays the photographing preview picture. In this way, camera switching may be conveniently performed, and the user may randomly synthesize an image captured by the front-facing cameras or an image captured by the rear-facing cameras, thereby improving selection diversity and convenience for the user.

Figure 5:
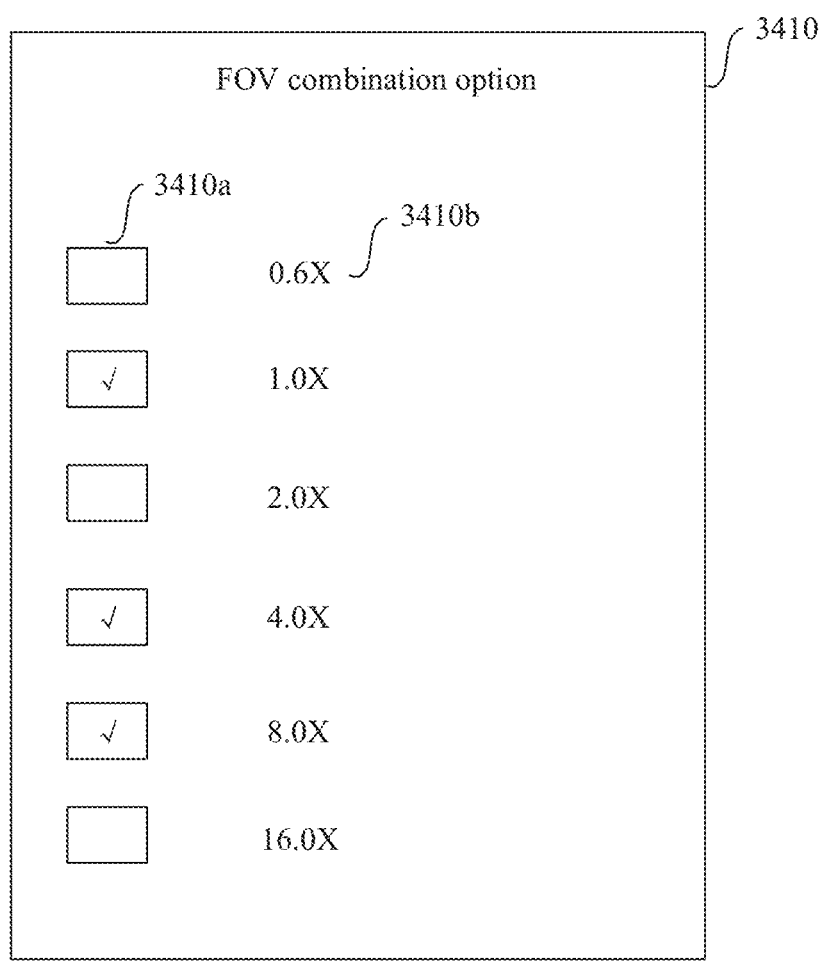
FIG. 5 is a schematic diagram of an FOV combination option box in a single camera scenario according to an embodiment of this application.
Figure 6:
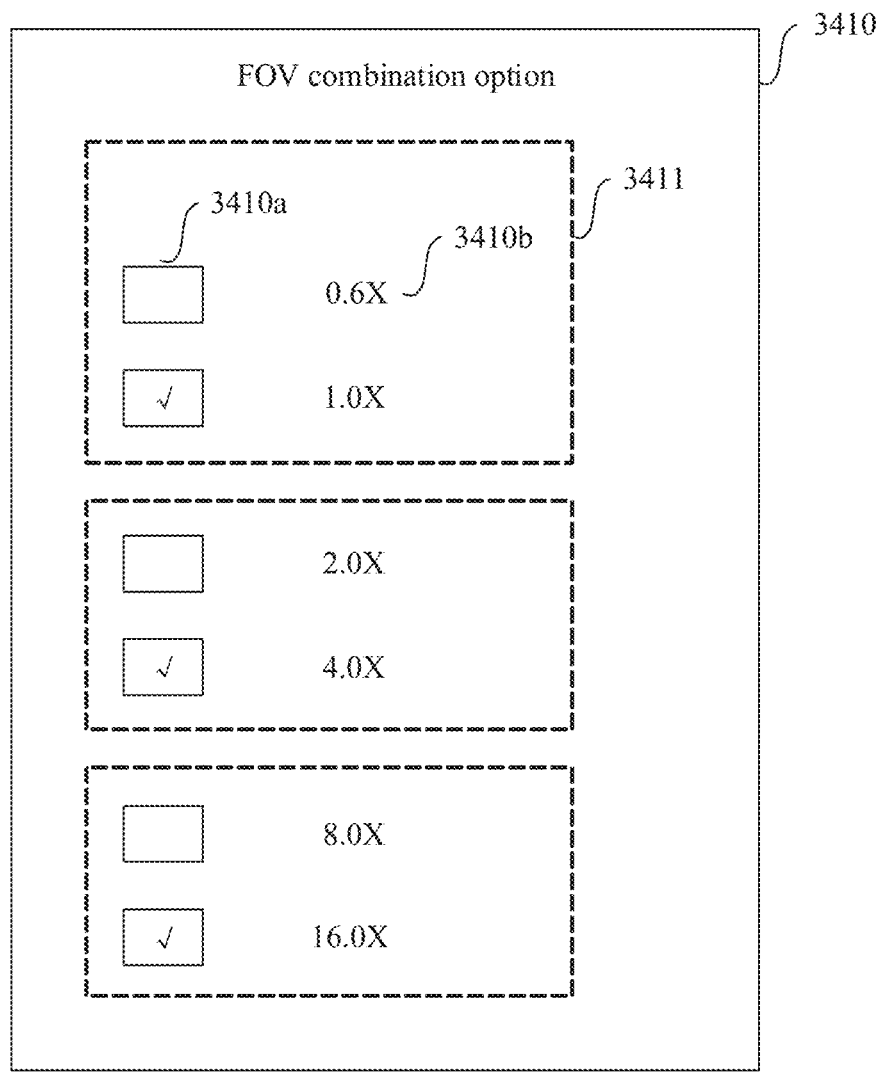
FIG. 6 is a schematic diagram of an FOV combination option box in a multi-camera scenario according to an embodiment of this application.

In specific implementation, a mobile terminal with a single camera is used as an example. FIG. 5 shows a presentation form of the FOV combination option area 3410 in case of a single camera. The FOV combination option area 3410 includes one or more option boxes 3410a and FOV options 3410b. The user may click one or more of the option boxes to determine a current FOV combination. Each FOV option is corresponding to a zoom ratio, for example, 0.6×, 1×, 2×, 4×, 8×, and 16×. The FOV option is related to a zooming capability of the camera. As shown in FIG. 5, the 1.0×, 4.0×, and 8.0× option boxes are ticked, which means that the user selects three zoom ratios: 1.0×, 4.0×, and 8.0×. FIG. 6 shows a presentation form of the FOV combination option area 3410 in case of three cameras. The FOV combination option area 3410 includes sub-camera option areas 3411, and each sub-camera option area 3411 includes an option box 3410a and an FOV option 3410b. Each sub-camera option area 3411 is corresponding to one camera on the mobile terminal. When the FOV option is selected, only one option can be selected in each sub-camera option area 3411, so that each camera obtains a current zoom ratio, and each camera capture an image based on the currently set zoom ratio.

It should be noted that, on the display interfaces used to select a field of view shown in FIG. 5 and FIG. 6, for a camera corresponding to a current preview picture, the field-of-view options of the camera may be displayed in a prominent manner, for example, being bold, highlighted, or selected, so as to recommend, to the user, the field-of-view options corresponding to the camera. The field-of-view options of a same camera may be displayed in a same manner, for example, by using a same color and/or a same font. Further, the selected field-of-view options of all the cameras on a same side of the mobile terminal may also be displayed in a same manner, for example, by using a same color and/or a same font. Further, on the displayed display interface used to select a field of view, there may be a recommended default field-of-view combination, and the combination may be displayed in a prominent manner, for example, being bold, highlighted, or selected. By using the foregoing manner, the user can more conveniently and quickly select a field-of-view combination, thereby improving photographing efficiency.

It should be understood that each sub-camera option area 3411 may be corresponding to a zoom camera, or may be corresponding to a fixed-focus camera. If the camera is a zoom camera, a zoom ratio in the FOV option is an optical zoom ratio; or if the camera is a fixed-focus camera, a zoom ratio in the FOV option is a digital zoom ratio.

After the user selects the FOV combination, the user may click the FOV combination option in the mode parameter option 341 again, or may click anywhere on the screen, so as to exit a selection state of the current FOV combination option; or a confirmation button is set in the FOV combination option area 3410, so as to exit a selection state of the current FOV combination option after the user clicks the confirmation button. After the selection state of the current FOV combination option is exited, the FOV combination option is stored in the system, and the interface used for photographing in the multi-FOV mode shown in FIG. 3 is displayed.

In specific implementation, if the mobile terminal includes a plurality of cameras, for example, the mobile terminal may include two cameras, or the mobile terminal may include three cameras. Using the mobile terminal with three cameras as an example, if the three cameras of the mobile terminal are on a same side, the mobile terminal may include a wide angle (for example, a focal length of a wide angle is 16 mm, and the focal length may be changed through digital zoom) camera, a standard (for example, a standard focal length is 48 mm, and the focal length may be changed through digital zoom) camera, and a long-focus (a focal length of a long focus is 160 mm, and the focal length may be changed through digital zoom) camera. During photographing, the three cameras capture one image at the same time. Therefore, the mobile terminal with three cameras on a same side may obtain three images at the same time in the multi-FOV mode: a wide-angle image, a standard image, and a long-focus image. Each image is corresponding to a respective camera, that is, is corresponding to a currently set FOV of each camera.

It should be noted that, when the mobile terminal performs photographing in a multi-FOV mode with a single camera shown in FIG. 5, because when a single camera performs photographing, a plurality of images are successively photographed, it needs to be ensured that the plurality of images photographed in the multi-FOV mode are photographed based on the same exposure parameters. However, for photographing in the FOV mode with a plurality of cameras shown in FIG. 6, because the plurality of cameras performs photographing at the same time, the exposure parameters corresponding to images photographed by each camera are the same, where the exposure parameters include a focus, an exposure time, and a sensitivity.

Optionally, in step s1, after the user starts the camera, a user's operation may be further detected, and after a photographing instruction of the user is detected (for example, the user presses the photographing button 311 in the photographing operation area 310 on the display interface 300), the camera may be instructed to capture an image. The photographing instruction of the user may be performed by clicking the photographing button on the operation interface, or may be performed in a long press manner or in another manner, which is not limited in this embodiment of this application.

Step s2: Sort the images by target field of view, and sequentially superpose each image based on an arrangement of the images to obtain a first image.

Specifically, after a plurality of images with different FOVs are obtained, sorting may be performed in descending order or ascending order of the FOV values, so as to obtain ordered images. Then the ordered images are sequentially superposed to obtain a synthesized image, that is, the first image. The superposition is performed based on priority of fine details, that is, an image with finer details usually is overlaid on an image with less fine details.

In a possible implementation, an image corresponding to the smallest field of view is kept unchanged, and the images are sequentially superposed in ascending order of fields of view to obtain a synthesized image. In the sorting process, a field-of-view ratio of a current image to an image corresponding to the smallest field-of-view is sequentially obtained in ascending order of fields of view, and the current image is zoomed in based on the field-of-view ratio to obtain a zoomed-in image; and the center point of an image corresponding to the smallest field of view and the center point of the zoomed-in image are aligned, and then the two images are superposed to obtain a current intermediate synthesized image, where the image corresponding to the smallest field of view in an overlapping part is overlaid on the zoomed-in image; and a next zoomed-in image and the current intermediate synthesized image are superposed to generate a next intermediate synthesized image, where the current intermediate synthesized image in the overlapping part is overlaid on the next zoomed-in image until all the images are superposed to obtain a synthesized image.

Specifically, the image corresponding to the smallest FOV may be found in all images and named Fmin, and the image Fmin is kept unchanged. Then, a next image F1 larger than the Fmin is found based on an image sequence, and a ratio of F1/Fmin is calculated, and F1 is zoomed in based on the ratio through upsampling by using a method such as linear interpolation or B-spline interpolation. For example, assuming that the ratio of F1/Fmin is 2, the image F1 is zoomed in by 2 times through upsampling, so that the field of view of the image F1 is the same as the field of view of the image Fmin. Then the image F1 and the image Fmin are superposed to obtain the intermediate synthesized image X1, where the superposition process is performed based on priority of fine details. That is, when the image F1 and the image Fmin are superposed, because the image Fmin is finer than the image F1, the image Fmin is overlaid on the image F1. After superposition of the image F1 is completed, a next image is superposed; that is, the next image F2 larger than F1 is found, and a ratio of F2/Fmin is calculated. Similarly, F2 is zoomed in based on the ratio through upsampling by using a method such as linear interpolation or B-spline interpolation. Then, the image F2 and the image X1 are superposed. The superposition process is also performed based on priority of fine details. Because the image X1 is finer than F2, the image X1 is overlaid on the image F2 to an intermediate synthesized image X2, and then a next image is found for superposition until all the images are superposed.

It should be understood that, in the synthesis process, all images except the image Fmin may be first zoomed in through upsampling to obtain a corresponding zoomed-in image. Then, overlaying may be performed sequentially starting from the zoomed-in image of an image corresponding to the largest FOV. For example, assuming that Fmin is the first image and an image corresponding to the largest FOV is the last image, first, a zoomed-in image of an image preceding the image corresponding to the largest FOV (that is, the zoomed-in image of the second last image) is overlaid on the zoomed-in image of the last image, and then the zoomed-in image of the third last image is overlaid on the zoomed-in image of the second last image, and the overlaying continues until the first image Fmin is overlaid on the zoomed-in image of the second image, that is, all images are overlaid. The final synthesis effect is shown in FIG. 7.

It should be understood that, in image processing, upsampling means that a new element is inserted between pixels based on the original image by using a proper interpolation algorithm (for example, nearest neighbor interpolation, bilinear interpolation, and mean interpolation), so as to improve resolution of the original image.

Figure 7:
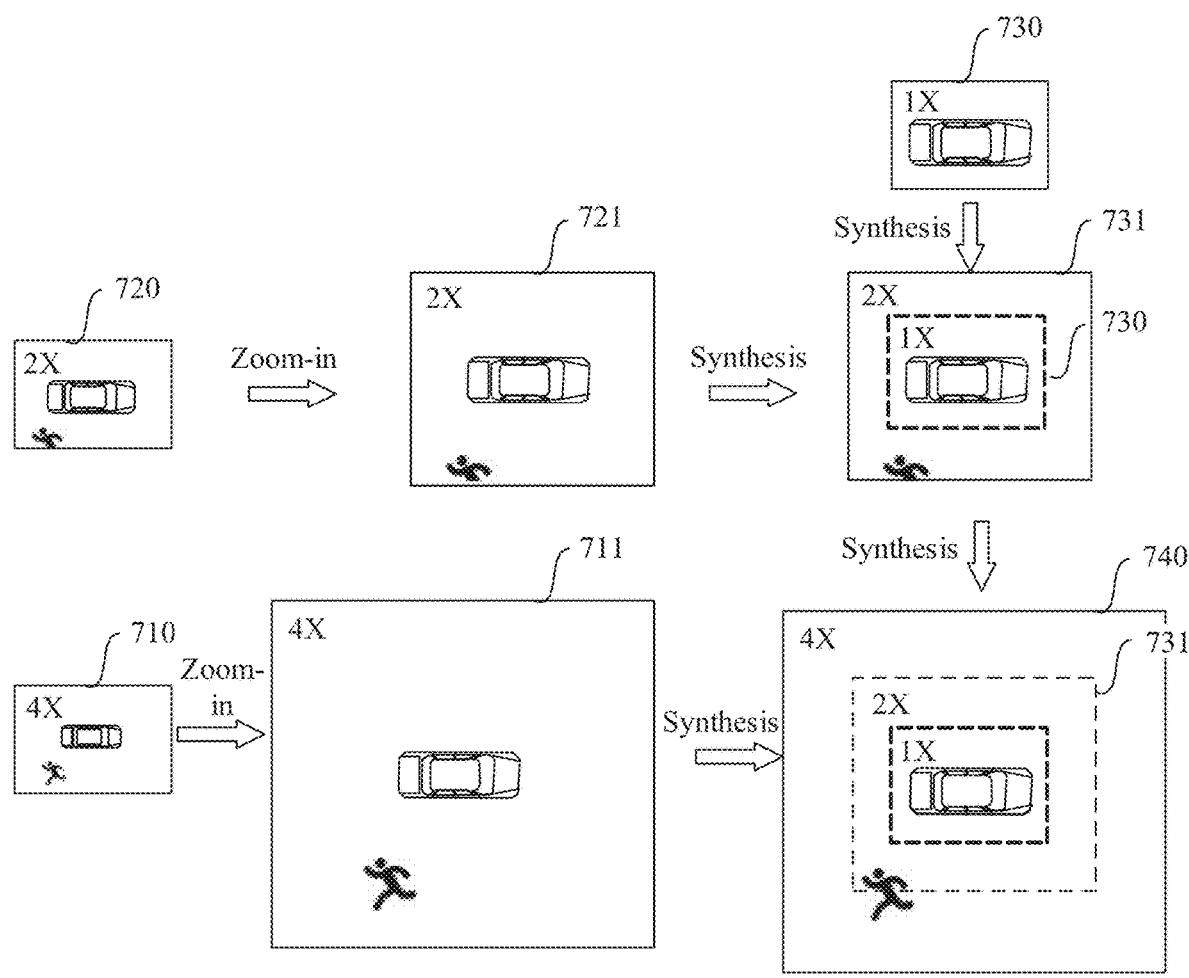
FIG. 7 is a schematic diagram of an image processing method according to an embodiment of this application.

With reference to FIG. 7, synthesis of three images is used as an example for description. After the three images are sorted by fields of view of the images, the following image are obtained: an image 710 corresponding to the largest field of view, with a corresponding zoom ratio of 4×; an image 720 corresponding to a smaller field of view, with a corresponding zoom ratio of 2×; and an image 730 corresponding to the smallest field of view, with a corresponding zoom ratio of 1×. Then, the image 730 corresponding to the smallest field of view is kept unchanged, and an FOV ratio S1 between the image 710 and the image 720 is obtained through calculation, that is, S1=2, and an FOV ratio S2 between the image 710 and the image 730 is obtained through calculation, that is, S2=4. The image 720 is zoomed in based on S1, that is, the image 720 is zoomed in by 2 times (where the zoom-in is scale-up) to obtain an image 721. The image 721 is merged with the image 730. In the merging process, the image 730 is overlaid on the image 721 through alignment based on the center points of the two images; that is, the center point of the image 730 is aligned with the center point of the image 721, and then the overlaying is performed, so as to obtain an intermediate synthesized image 731. Then, the image 710 is zoomed in based on S2, that is, the image 710 is zoomed in by 4 times (where the zoom-in is scale-up) to obtain an image 711. The image 711 is merged with the image 731. In the merging process, the image 731 is overlaid on the image 711 through alignment based on the center points of the two images; that is, the center point of the image 731 is aligned with the center point of the image 711, and then the overlaying is performed, so as to obtain a final synthesized image 740. Two photos including 3000*3000 pixels are used as an example. One of the two photos has a zoom ratio of 2× and a corresponding FOV of 0.5, and the other photo has a zoom ratio of 4× and a corresponding FOV of 0.25. The 4× photo may be kept unchanged, and the resolution of the 2× photo is increased to 2 times the original resolution through upsampling, that is, the 2× photo includes 6000*6000 pixels. Then, the center point of the 2× photo and the center point of the 4× photo center are aligned, and then the two images are superposed to obtain a photo including 6000*6000 pixels. After the foregoing operations, the photo is zoomed in, and the photo with the largest FOV is selected in the two photos. In addition, in the pixel range 3000*3000 of the central area, because the photo with the smaller FOV is selected in the two images, the pixel range 3000*3000 of the central area does not lead to a lower resolution after the photo is zoomed-in. Therefore, the synthesized photo can meet the requirements of FOV and fine details.

It should be noted that, in the superposition process, the center points of the two to-be-synthesized images may be aligned before the two images are synthesized, and the alignment may be performed by using a rigid registration method, for example, a rigid registration method based on mutual information or a feature-based registration method.

In a possible implementation, an image corresponding to the largest field of view is kept unchanged, and the images are sequentially superposed in descending order of fields of view to obtain a synthesized image. In the sorting process, a field-of-view ratio of an image corresponding to the largest field-of-view to a current image is sequentially obtained in descending order of fields of view, and the current image is zoomed out based on the field-of-view ratio to obtain a zoomed-out image; and the center point of an image corresponding to the smallest field of view and the center point of the zoomed-out image are aligned, and then the two images are superposed to obtain a current intermediate synthesized image, where the zoomed-in image in an overlapping part is overlaid on the image corresponding to the largest field of view; and a next zoomed-out image and the current intermediate synthesized image are superposed to generate a next intermediate synthesized image, where the next zoomed-out image in the overlapping part is overlaid on the current intermediate synthesized image until all the images are superposed to obtain a synthesized image.

Specifically, the image corresponding to the largest FOV may be found in all images and named Fmax, and the image Fmax is kept unchanged. Then, a next image F1 smaller than Fmax is found based on an image sequence, and a ratio of Fmax/F1 is calculated, and F1 is zoomed out based on the ratio through downsampling by using a method such as linear interpolation or B-spline interpolation. For example, assuming that the ratio of Fmax/F1 is 2, the image F1 is zoomed out by 2 times through downsampling, so that the field of view of the image F1 is the same as the field of view of the image Fmax. Then the image F1 and the image Fmax are superposed to obtain the intermediate synthesized image X1, where the superposition process is performed based on priority of fine details priority. That is, when the image F1 and the image Fmax are superposed, because the image F1 is finer than the image Fmax, the image F1 is overlaid on the image Fmax. After superposition of the image F1 is completed, a next image is superposed; that is, the next image F2 smaller than F1 is found, and a ratio of Fmax/F2 is calculated. Similarly, F2 is zoomed out based on the ratio through downsampling by using a method such as linear interpolation or B-spline interpolation. Then, the image F2 and the image X1 are superposed. The superposition process is also performed based on priority of fine details. Because the image F2 is finer than X1, the image F2 is overlaid on the image X1 to an intermediate synthesized image X2, and then a next image is found for superposition until all the images are superposed.

It should be understood that, in the synthesis process, all images except the image Fmax may be first zoomed out through downsampling to obtain a corresponding zoomed-out image. Then, starting from the image F1, the zoomed-out image may be sequentially overlaid on the previous zoomed-out image. For example, the zoomed-out image of the image F1 is first overlaid on the zoomed-out image of the image Fmax, and then the zoomed-out image of the image F2 is overlaid on the zoomed-out image of the image F1 until all the images are overlaid. The final synthesis effect is shown in FIG. 8.

It should be understood that, in image processing, subsampling means that the size of an original image is reduced. For example, for an image whose size is M*N, downsampling is performed on the image based on S times to obtain an image with a resolution of (M/S)*(N/S), where S should be a common number of M and N. If the image is in a matrix form, the image in the original image S*S window is changed into a pixel, and a value of the pixel is the average value of all the pixels in the window.

Figure 8:
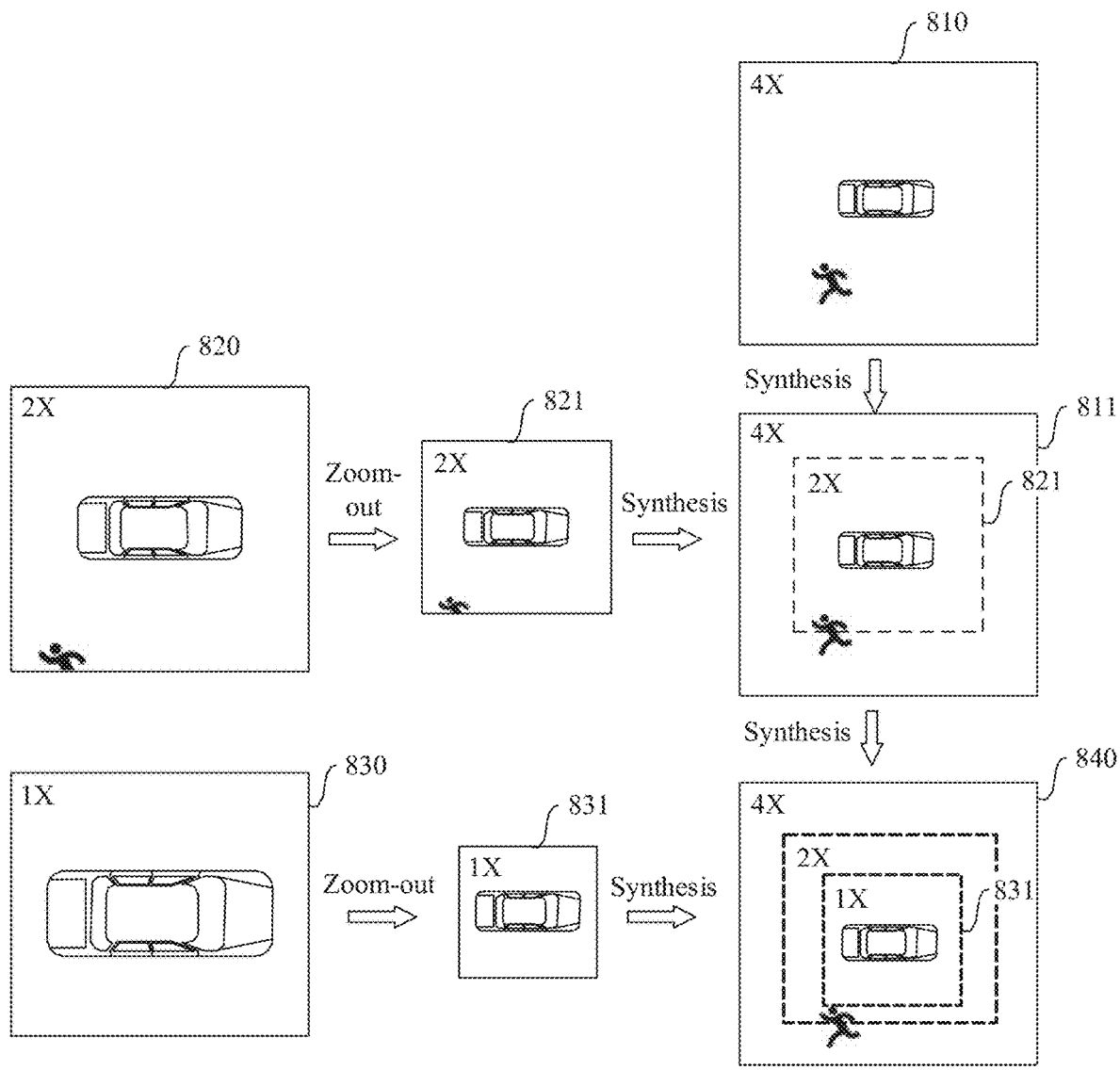
FIG. 8 is a schematic diagram of another image processing method according to an embodiment of this application.

With reference to FIG. 8, synthesis of three images is used as an example for description. After the three images are sorted by fields of view of the images, the following image are obtained: an image 810 corresponding to the largest field of view, with a corresponding zoom ratio of 4×; an image 820 corresponding to a smaller field of view, with a corresponding zoom ratio of 2×; and an image 830 corresponding to the smallest field of view, with a corresponding zoom ratio of 1×. Then, the image 810 corresponding to the largest field of view is kept unchanged, and an FOV ratio S1 between the image 810 and the image 820 is obtained through calculation, that is, S1=2, and an FOV ratio S2 between the image 810 and the image 830 is obtained through calculation, that is, S2=4. The image 820 is zoomed out based on S1, that is, the image 820 is zoomed out by 2 times to obtain an image 821. The image 821 is merged with the image 810. In the merging process, the image 821 is overlaid on the image 810 through alignment based on the center points of the two images; that is, the center point of the image 810 is aligned with the center point of the image 821, and then the overlaying is performed, so as to obtain an intermediate synthesized image 811. Then, the image 830 is zoomed out based on S2, that is, the image 830 is zoomed out by 4 times to obtain an image 831. The image 831 is merged with the image 811. In the merging process, the image 831 is overlaid on the image 811 through alignment based on the center points of the two images; that is, the center point of the image 811 is aligned with the center point of the image 831, and then the overlaying is performed, so as to obtain a final synthesized image 840. Similarly, two photos whose pixels are both 3000*3000 are used as an example. One of the two photos has a zoom ratio of 2×, a corresponding FOV of 0.5, and another of the two photos has a zoom ratio of 4×, and a corresponding FOV of 0.25. The 2× photo may be first kept unchanged, and the resolution of the 4× photo is decreased by 2 times through downsampling, that is, the 4× photo is decreased to 1500*1500 pixels. Then the 2× photo and the 4× photo are aligned and superposed to obtain a photo of 3000*3000 pixels, so as to meet the requirements of a large scenario and fine details.

In a possible implementation, if photographing is performed in the multi-camera mode shown in FIG. 6, a plurality of images may be obtained at the same time, where each image is corresponding to one camera.

Specifically, in the multi-camera photographing mode shown in FIG. 6, when the user selects a plurality of fields of view, it means that the user selects a plurality of cameras, and each field of view may be corresponding to one camera. In this way, when photographing is performed, the original captured image obtained by each selected camera may be saved, and then the original captured image obtained by each selected camera may be synthesized, and the synthesized image is associated with the original captured image captured by each selected camera. Therefore, when zooming is performed subsequently, a corresponding original captured image may be invoked, so as to meet the requirements of zooming and image clarity.

It should be noted that, when photographing is performed in a multi-FOV mode by using a plurality of cameras, a camera system of the mobile terminal may simultaneously output a plurality of data streams of different fields of view. Using three cameras as an example, one wide-angle camera, one standard camera, and one long-focus camera are used. Frame synchronization and 3A synchronization of the three cameras are ensured by the camera system. 3A includes an AWB (automatic white balance), an Automatic Exposure (AE), and an Automatic Focus (AF). After the user starts to perform photographing, the three cameras may separately collect data based on an FOV parameters set by the three cameras, to obtain corresponding data streams. A data stream of the wide-angle camera may be corresponding to WData; a data stream of the standard camera may be corresponding to SDdata1; and a data stream of the long-focus camera may be corresponding to TDdata1. The data streams may be used for generating images, that is, a wide-angle image W1 may be generated by using the data stream WData1, a standard image S1 may be generated by using the data stream SData1, and a wide-angle image T1 may be generated by using the data stream TData1. In addition, in the data collection process, metadata corresponding to each camera may be further obtained by using the camera system, that is, the data stream WData1, the data stream SDdata1, and the data stream TData1 are have corresponding metadata. The metadata is mainly used to data attribute information, and is used to support functions such as indicating storage location, historical data, resource search, and file records.

Further, after the data stream WData1, the data stream SDdataK, the data stream TData1, and the corresponding metadata are obtained, stretching and alignment operations may be performed on the image W1, the image S1, and the image T1 by using a focus as a reference, so as to obtain the image W2, the image S2, and the image T2.

Further, after the image W2, the image S2, and the image T2 are obtained, three images may be synthesized by using the image synthesis methods shown in FIG. 7 and FIG. 8, so as to obtain a final synthesized JPEG image.

Figure 9:
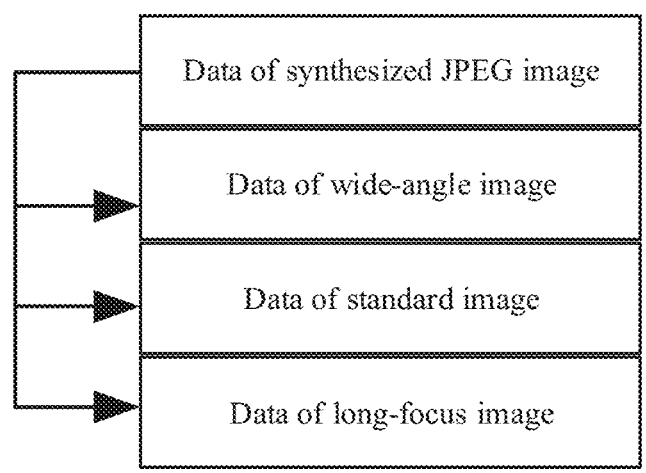
FIG. 9 is a schematic diagram of a data storage format according to an embodiment of this application.

It should be noted that the image W2, the image S2, and the image T2 are original images; that is, the image W2, the image S2, and the image T2 are corresponding to images that are obtained by using inherent parameters of the cameras. For example, an inherent photographing angle of a wide-angle camera is 120 degrees, and after an FOV is set by the user, and a current photographing angle is 100 degrees, the images used for synthesis have a photographing angle of 100 degrees. The data of the synthesized JPEG image is bound to the data of the original image W2, the data of the original image S2, and the data of the original image T2, and is used for later image processing, for example, zooming in or zooming out. FIG. 9 shows the format in which the final synthesized image is stored. The data of the wide-angle image (W2), the data of the standard image (S2), and the data of the long-focus image (T2) are associated with the data of the synthesized JPEG image. When image preview is performed, the data of the JPEG image may be invoked. When zooming in and zooming out is performed, the data of the wide-angle image (W2), the data of the standard image (S2), and the data of the long-focus image (T2) that are associated may be invoked, so as to meet the requirements of zooming and image clarity.

Step s3: Display the first image.

Specifically, after all the images are superposed, the current final synthesized image, that is, the first image, may be displayed on the display screen. The first image may also be stored in a graphics library, so that the user can browse and perform post-processing to obtain a second image, where the post-processing includes zooming in and zooming out.

Figure 10:
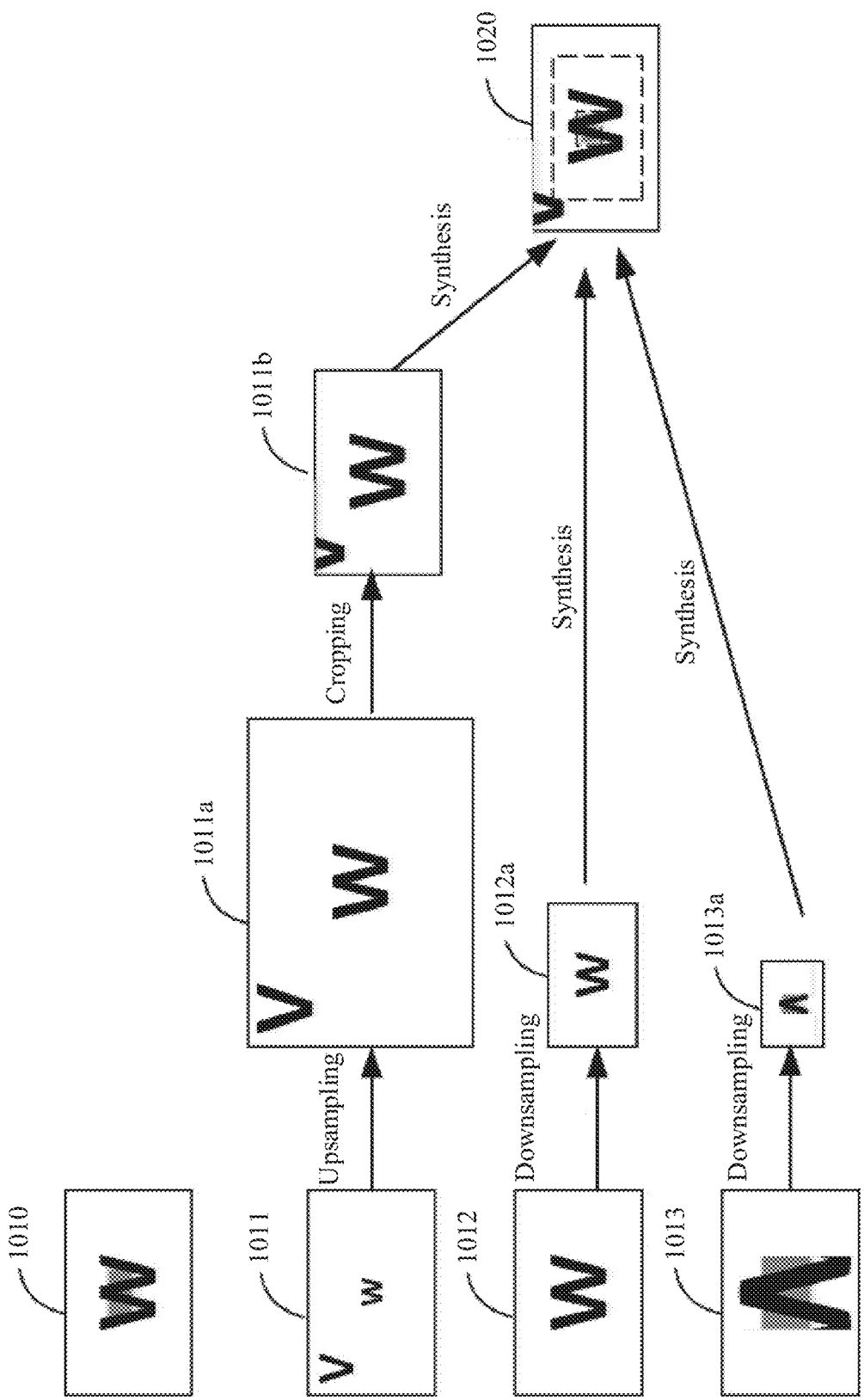
FIG. 10 is a schematic diagram of still another image processing method according to an embodiment of this application.
Figure 11:
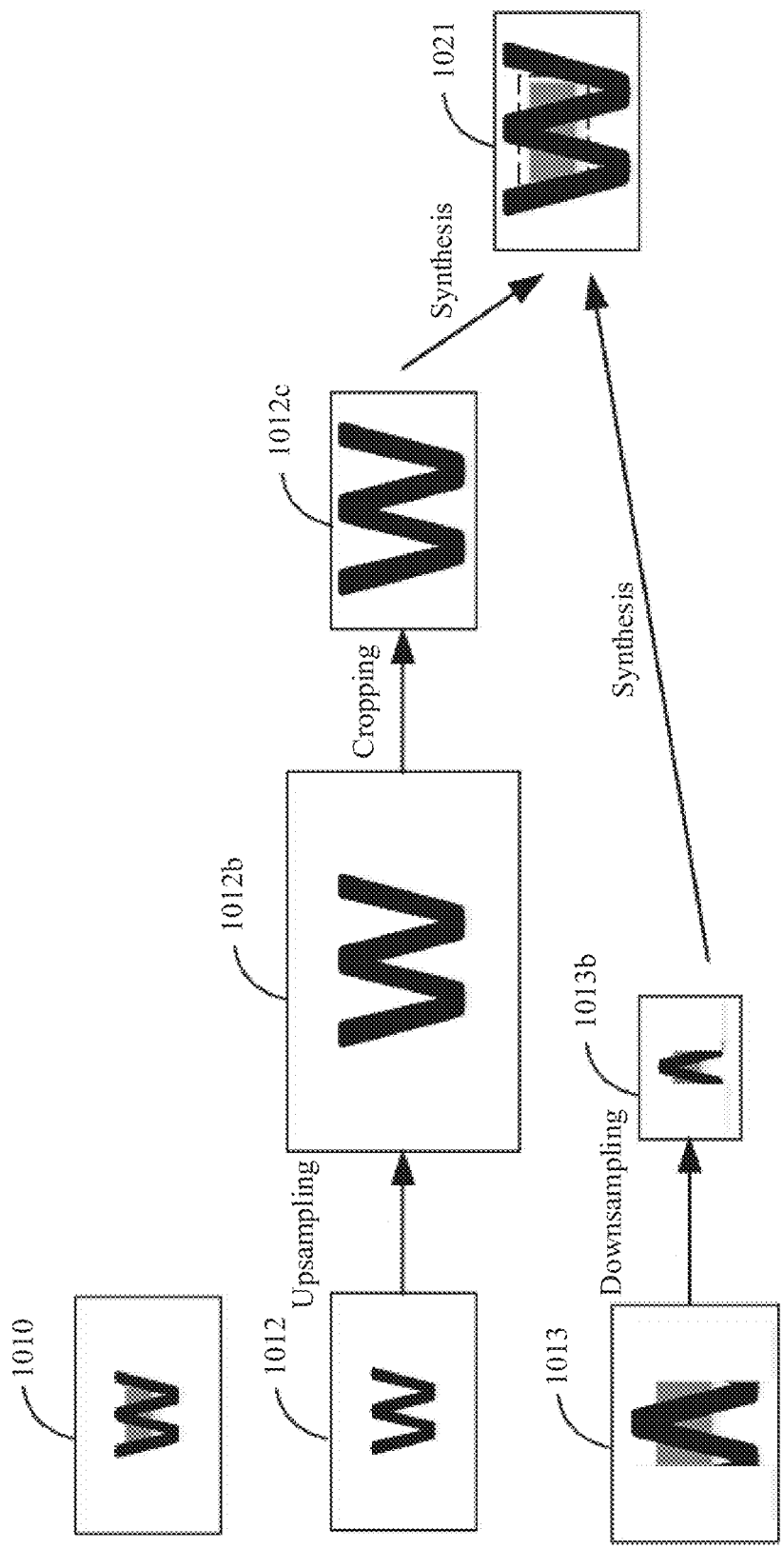
FIG. 11 is a schematic diagram of yet another image processing method according to an embodiment of this application.

In a possible implementation, if the image is synthesized by using the method shown in FIG. 9, post-processing may be performed by using the methods shown in FIG. 10 to FIG. 11, and the post-processing may include zooming in and zooming out. The user may preset a zoom-in ratio and a zoom-out ratio. For example, the zoom-out ratio may range from 0.33 to 1, and the zoom-in ratio may range from 1 to 3.33 or the zoom-in ratio is greater than 3.33.

In a process in which the user browses the current preview image, if the user performs a zooming operation on the current preview image, an image zooming instruction is issued to a processor of the mobile terminal, and the instruction includes a zoom ratio. After receiving the image zooming instruction, the processor of the mobile terminal may synthesize the original images based on the zoom ratio in the instruction, so as to form the second image, and display the second image on the display screen.

It should be noted that the zooming operation performed by the user on the current preview image may also be a continuous dynamic operation process until the current preview image is zoomed to an expected image size. Therefore, in an entire zooming operation process, a series of image zooming instructions may be continuously issued to the processor of the mobile terminal, and the processor of the mobile terminal determines a current zooming ratio based on the currently received image zooming instruction. In addition, the zoom-in ratio depends on a parameter of a hardware camera, that is, the zoom ratio has a specific range, and infinite zooming-in and zooming-out cannot be performed.

A zoom-out scenario of an image is described with reference to FIG. 10. A zoom ratio corresponding to data of a synthesized JPEG image 1010 is 1, a zoom ratio corresponding to data of a wide-angle image 1011 is 0.3, a zoom ratio corresponding to data of a standard image 1012 is 1, and a zoom ratio corresponding to data of a long-focus image 1013 is 4; and all these four images have a resolution of 3000*3000 and a zoom-out ratio of 0.5.

First, the data of the wide-angle image 1011 is upsampled, and the image is zoomed in to 0.5/0.3 times (that is, 5/3 times) the original size to obtain a wide-angle upsampled image 1011a, where the resolution of the wide-angle upsampled image 1011a is changed to 5000*5000. Then, the data of the standard image 1012 is downsampled, and the image is zoomed out to 1/0.5 times (that is, 2 times) the original size to obtain a standard downsampled image 1012a, where the resolution of the standard downsampled image 1012a is changed to 1500*1500. Then, the data of the long-focus image 1013 is downsampled, and the image is zoomed out to 4/0.5 times (that is, 8 times) the original size to obtain a long-focus downsampled image 1013a, where the resolution of the long-focus downsampled image 1013a is changed to 375*375. Then, the wide-angle upsampled image 1011a, the standard downsampled image 1012a, and the long-focus downsampled image 1013a are merged to obtain a zoomed-out synthesized image 1020, and the zoomed-out synthesized image 1020 is displayed.

It should be noted that, in the merging process, because the wide-angle upsampled image 1011a has been upsampled, and the size of the image has changed, cropping needs to be performed. Specifically, the wide-angle upsampled image 1011a may be cropped to obtain the wide-angle downsampled image 1011b with a resolution of 3000*3000, and then the standard downsampled image 1012a and the long-focus downsampled image 1013a are sequentially superposed on the wide-angle downsampled image 1011b, so as to obtain the zoomed-out synthesized image 1020. After cropping and superposition, the size of the original image 1010 does not change, and an edge part of the zoomed-out original image 1010 may be filled with a wide-angle cropped image 1011b, thereby expanding a field of view. The central part may be filled with the standard downsampled image 1012a and the long-focus downsampled image 1013a, so that details of the central area are clearer, thereby meeting the requirements of image zooming-out and a larger field of view.

Next, an image zooming-in scenario is described with reference to FIG. 11. A zoom ratio corresponding to the synthesized JPEG image 1010 is 1, a zoom ratio corresponding to the data of the standard image 1012 is 1, and a zoom ratio corresponding to the data of the long-focus image 1013 is 4; and all these three images have a resolution of 3000*3000 and a zoom-in ratio of 2.

First, the data of the standard image 1012 is upsampled, and the size of the image is zoomed in to 2/1 times (that is, 2 times) the original size to obtain a standard upsampled image 1012b, where the resolution of the standard upsampled image 1012b is changed to 6000*6000. Then, the data of the long-focus image 1013 is downsampled, and the size of the image is zoomed out to 2/4 times (that is, 2 times) the original size to obtain a long-focus downsampled image 1013b, where the resolution of the long-focus downsampled image 1013b is changed to 1500*1500. Then, the standard downsampled image 1012b and the long-focus downsampled image 1013b are merged to obtain a zoomed-out synthesized image 1021, and the zoomed-out synthesized image 1021 is displayed.

It should be noted that, in the merging process, because the standard upsampled image 1012b has been upsampled, and the size of the image has changed, cropping needs to be performed. Specifically, the standard upsampled image 1012b may be cropped to obtain a standard cropped image 1012c with a resolution of 3000*3000, and then the long-focus downsampled image 1013b is superposed on the standard cropped image 1012c, so as to obtain the zoomed-in synthesized image 1021. After cropping and superposition, the size of the original image 1010 does not change, and a central part may be filled with the long-focus downsampled image 1013b, so that details of the central area are clearer, thereby meeting the requirements of image zoom-in and preventing image distortion.

In a possible implementation, the data of the wide-angle image 1011 may be further zoomed-in. For example, in the foregoing zoom-in method, the data of the wide-angle image 1012 may be first zoomed in through upsampling, and cropping is performed based on the original image size, so as to obtain a zoomed-in image, and the zoomed-in image is displayed.

Figure 12:
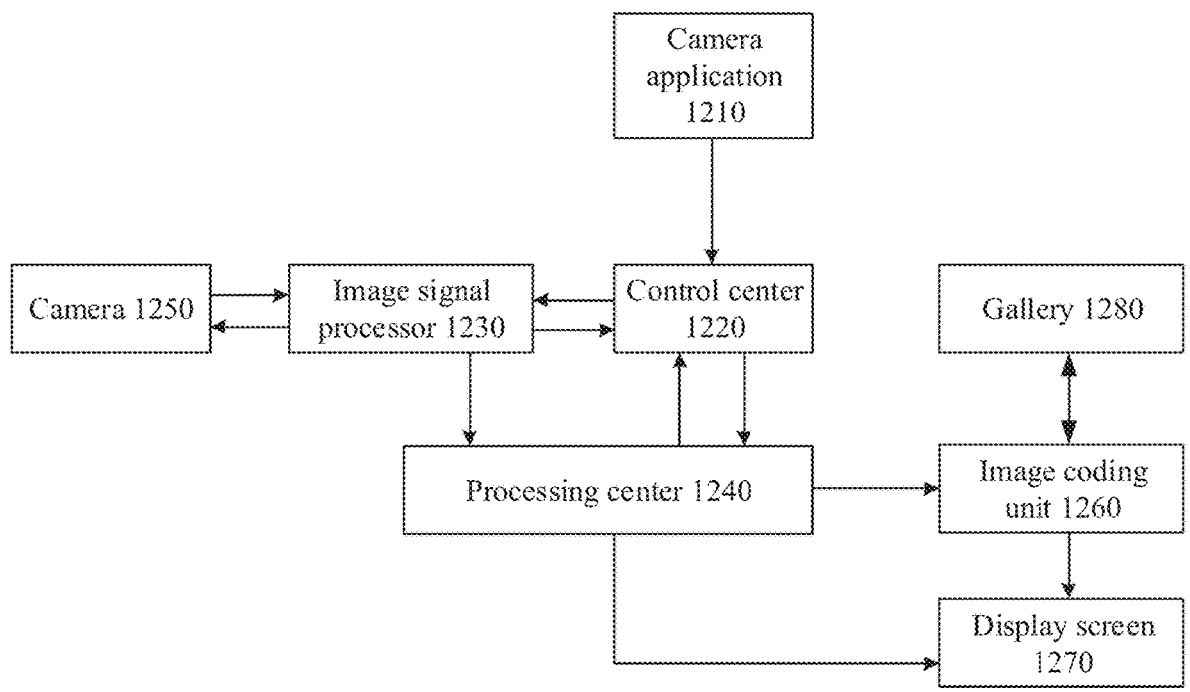
FIG. 12 is a schematic diagram of a system architecture of a mobile terminal according to an embodiment of this application.

FIG. 12 is a schematic diagram of a system architecture 1200 of a mobile terminal according to an embodiment of this application. The system architecture is used to implement the method provided in the foregoing method embodiment.

A camera application (APP) 1210 is configured to obtain an FOV selection instruction or a photographing instruction that is entered by a user.

A control center 1220 is configured to: detect a current instruction entered by the user; and if the current instruction entered by the user is an FOV selection instruction, send an FOV combination mode selected by the user to an image signal processor (ISP) 1230, or if the current instruction entered by the user is a photographing instruction, request a target exposure mode from a processing center 1240.

The processing center 1240 is configured to send a target exposure parameter to the control center 1220 based on the request of the control center 1220, where the target exposure parameter includes a focus, an exposure time, and a sensitivity.

The control center 1220 is further configured to: after receiving the target exposure parameter, send the target exposure parameter to the image signal processor 1230, and instruct the image signal processor 1230 to capture a plurality of images based on the FOV combination mode and the target exposure parameter.

In a possible implementation, the control center 1220 may be, for example, an operating system of the mobile terminal.

In a possible implementation, the processing center 1240 may be, for example, a background processing module that matches the camera.

The image signal processor 1230 is configured to control the camera 1250 to capture a plurality of images based on the FOV combination mode and the target exposure parameter, and send the plurality of captured images to the processing center 1240.

The control center 1220 is further configured to send the plurality of captured images obtained from the image signal processor 1230 to the processing center 1040.

The image signal processor 1230 is further configured to associate each captured image with a corresponding FOV mode or associate each captured image with a corresponding camera.

The processing center 1240 is further configured to send, to an image coding unit 1260, the captured images sent from the control center 1220 or the image signal processor 1230.

The processing center 1240 is further configured to determine a current photographing mode, and instruct a display screen 1270 to display the current photographing mode.

The processing center 1240 is further configured to instruct the display screen 1270 to display a current operation interface based on a current instruction of the user.

The image coding unit 1260 is configured to: after coding the captured image sent from the processing center 1240, send the captured image to the display screen 1270, and store the coded image in a graphics library 1280.

In a possible implementation, the image coding unit 1260 is further configured to: store an original captured image, and associate the original captured image with the coded image.

The display screen 1270 is configured to display, to the user, the coded image sent by the image coding unit 1260.

The display screen 1270 is further configured to display a current photographing mode to the user.

The display screen 1270 is further configured to display a current operation interface to the user based on an instruction of the user.

The processing center 1240 is further configured to: perform synthesis processing on the obtained plurality of captured images to obtain a first image, send the first image to the image coding unit 1260, display the first image on the display screen 1270, and store the first image in the graphics library 1280.

In a possible implementation, the library 1280 is further configured to receive an image editing instruction of the user, and instruct, based on the image editing instruction, the image coding unit 1260 to synthesize the original captured images stored in the image coding unit 1260.

The image coding unit 1260 is further configured to synthesize the stored original captured images based on an instruction of the graphics library 1280, so as to obtain a second image, and instruct the display screen 1270 to display the second image after the synthesis is completed.

It may be understood that the interface connection relationship between the modules illustrated in this embodiment of the present disclosure is merely an example for description, and does not constitute a limitation on the structure of the mobile terminal 100. In some other embodiments of this application, the mobile terminal 100 may alternatively use an interface connection mode that is different from those in the foregoing embodiments, or use a combination of a plurality of interface connection modes.

It may be understood that, to implement the foregoing functions, the foregoing terminal and the like include corresponding hardware structures and/or software modules for performing the functions. A person skilled in the art should easily realize that, with reference to the units and algorithm steps described in the embodiments disclosed in this specification, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present disclosure.

In the embodiments of this application, the foregoing terminal and the like may be divided into functional modules based on the foregoing method examples. For example, each functional module may be obtained through division for a corresponding function, or two or more functions may be integrated into one processing module. The integrated modules may be implemented in a form of hardware, or may be implemented in a form of a software function module. It should be noted that module division in the embodiments of the present disclosure is an example, and is merely logical function division. In actual implementation, there may be another division manner.

The foregoing descriptions about implementations allow a person skilled in the art to clearly understand that, for the purpose of convenient and brief description, division of the foregoing functional modules is used only as an example for illustration. In actual application, the foregoing functions can be allocated to different functional modules and implemented according to needs, that is, an inner structure of an apparatus is divided into different functional modules to implement all or some of the functions described above. For the specific working processes of the system, apparatus and units described above, reference may be made to the corresponding processes in the above-mentioned method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a computer readable storage medium. Based on such understanding, the technical solution of this embodiment of this application which is essential or a part contributing to the existing technology or all or a part of the technical solution may be embodied in the form of a software product, and the computer software product is stored in a storage medium and includes several instructions for enabling a computer device (which may be a personal computer, a server or a network device) or the processor 130 to perform all or some steps of the method according to each embodiment of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. An image processing method, comprising:
   detecting, by a mobile terminal, a first operation used to select a photographing mode, wherein at least one camera is disposed on the mobile terminal;
   determining, by the mobile terminal, a current photographing mode based on the first operation;
   displaying, by the mobile terminal, a display interface used to select a field of view, wherein the display interface comprises an option of a field of view corresponding to the at least one camera;
   detecting, by the mobile terminal, a second operation used to select options of at least two fields of view;
   determining, by the mobile terminal, at least two fields of view corresponding to the current photographing mode based on the second operation, wherein the at least two fields of view are corresponding to one or more cameras;

detecting, by the mobile terminal, a third operation used for photographing;

obtaining, by the mobile terminal, a plurality of images corresponding to the at least two fields of view based on the third operation, wherein each of the at least two fields of view is corresponding to at least one image, and wherein each image in the plurality of images has same exposure parameters;

synthesizing, by the mobile terminal, the plurality of images to form a first image; and displaying, by the mobile terminal, the first image.

2. The method according to claim 1, wherein before the detecting the first operation used to select the photographing mode, the method further comprises:

starting a first camera; and displaying a first photographing preview interface captured by the first camera;

wherein:

the display interface used to select the field of view comprises only a field of view corresponding to the first camera; or the display interface used to select the field of view comprises only a field of view corresponding to the first camera, and a field of view corresponding to another camera on a same side of the mobile terminal as the first camera; or on the display interface used to select the field of view, an option of the field of view corresponding to the first camera is displayed in a prominent manner; or on the displayed display interface used to select a field of view, fields of view corresponding to a same camera are displayed in a same manner; or on the display interface used to select the field of view, fields of view corresponding to cameras on a same side of the mobile terminal are displayed in a same manner; or on the display interface used to select the field of view, a recommended combination of fields of view is displayed in a prominent manner.

3. The method according to claim 2, wherein after the starting the first camera, and the displaying the first photographing preview interface captured by the first camera, the method further comprises:

detecting a fourth operation used to switch a camera;

starting a second camera to based on the fourth operation; and displaying a second photographing preview interface captured by the second camera;

wherein:

the display interface used to select the field of view comprises only a field of view corresponding to the second camera; or the display interface used to select the field of view comprises only a field of view corresponding to the second camera, and a field of view corresponding to another camera on a same side of the mobile terminal as the second camera; or on the display interface used to select the field of view, an option of the field of view corresponding to the second camera is displayed in a prominent manner.

4. The method according to claim 1, wherein the synthesizing the plurality of images comprises:

sorting the plurality of images by field of view, and sequentially superposing each image.

5. The method according to claim 4, wherein the sequentially superposing each image comprises:

sequentially obtaining, in descending order of fields of view, a field of view ratio S of each image to an image Fmin corresponding to a smallest field of view;

keeping the image Fmin corresponding to the smallest field of view unchanged, and sequentially zooming in the remaining images based on the corresponding field of view ratio S to obtain a zoomed-in image; and sequentially superposing the image Fmin and all zoomed-in images in ascending order of fields of view.

6. The method according to claim 4, wherein the sequentially superposing each image comprises:

sequentially obtaining, in descending order of fields of view, a field of view ratio S of an image Fmax corresponding to a largest field of view to each image;

keeping the image Fmax corresponding to the largest field of view unchanged, and sequentially zooming in the remaining images based on the corresponding field of view ratio S to obtain a zoomed-out image; and sequentially superposing the image Fax and all zoomed-out images in ascending order of fields of view.

7. The method according to claim 1, wherein the obtaining the plurality of images corresponding to the at least two fields of view comprises:

based on the at least two fields of view corresponding to a plurality of cameras, storing an original captured image corresponding to each camera of the plurality of cameras; and wherein the synthesizing the plurality of images comprises:

synthesizing the original captured image corresponding to each camera of the plurality of cameras to generate a synthesized image, and associating the synthesized image with the original captured image corresponding to each camera of the plurality of cameras.

8. The method according to claim 7, wherein after the displaying the synthesized image, the method further comprises:

detecting a fifth operation used for zooming; and determining a current zoom mode and a current zoom ratio based on the fifth operation, wherein the current zoom mode comprises a first zoom mode or a second zoom mode;

wherein:

based on the current zoom mode being the first zoom mode, obtaining all original captured images corresponding to the synthesized image, zooming the original images based on the current zoom ratio, to form a second image, and displaying the second image; and based on the current zoom mode being the second zoom mode, obtaining a maximum of two original captured images corresponding to the synthesized image, zooming the original images based on the current zoom ratio, to form a second image, and displaying the second image.

9. The method according to claim 1, wherein a number of the at least one camera is M cameras, a number of the plurality of images is N images, M is equal to N, and the N images are captured simultaneously by the M cameras.

10. The method according to claim 1, wherein a number of the at least one camera is one camera, a number of the plurality of images is N images, N is greater than one, the plurality of images are captured by the one camera at different times, and a shooting interval between two images in the plurality of images is less than a preset time threshold.

11. A mobile terminal, comprising:
a processor; and
a memory coupled to the processor, wherein the memory is configured to store computer program codes, the computer program codes comprise computer instructions, and wherein when the computer instructions are executed by the processor, the mobile terminal is caused to perform operations comprising:
determining a current photographing mode based on the first operation;
displaying a display interface used to select a field of view, wherein the display interface comprises an option of a field of view corresponding to the at least one camera;
detecting a second operation used to select options of at least two fields of view;
determining at least two fields of view corresponding to the current photographing mode based on the second operation, wherein the at least two fields of view are corresponding to one or more cameras;
detecting a third operation used for photographing;
obtaining a plurality of images corresponding to the at least two fields of view based on the third operation, wherein each of the at least two fields of view is corresponding to at least one image, and wherein each image in the plurality of images has same exposure parameters;
synthesizing the plurality of images to form a first image; and
displaying the first image.

12. A non-transitory computer-readable storage medium storing computer instructions that, when run on a mobile terminal, the mobile terminal is enabled to perform:
determining a current photographing mode based on the first operation;
displaying a display interface used to select a field of view, wherein the display interface comprises an option of a field of view corresponding to the at least one camera;
detecting a second operation used to select options of at least two fields of view;
determining at least two fields of view corresponding to the current photographing mode based on the second operation, wherein the at least two fields of view are corresponding to one or more cameras;
detecting a third operation used for photographing;
obtaining a plurality of images corresponding to the at least two fields of view based on the third operation, wherein each of the at least two fields of view is corresponding to at least one image, and wherein each image in the plurality of images has same exposure parameters;
synthesizing the plurality of images to form a first image; and
displaying the first image.

* * * * *

UNITED STATES PATENT AND TRADEMARK OFFICE
CERTIFICATE OF CORRECTION

| | |
|---|---|
| PATENT NO. | : 11,758,265 B2 |
| APPLICATION NO. | : 17/907806 |
| DATED | : September 12, 2023 |
| INVENTOR(S) | : Jiang et al. |

It is certified that error appears in the above-identified patent and that said Letters Patent is hereby corrected as shown below:

On the Title Page

Applicant (71): "Honor Device Co., Ltd., Guangdong (CN)" should read -- Honor Device Co., Ltd., Shenzhen (CN) --.

In the Claims

Claim 2, Column 25, Line 33: "on the displayed display interface used to select a field" should read -- on the display interface used to select a field --.

Claim 3, Column 25, Line 48: "starting a second camera to based on the fourth operation;" should read -- starting a second camera based on the fourth operation; --.

Signed and Sealed this
Seventeenth Day of October, 2023

Katherine Kelly Vidal
*Director of the United States Patent and Trademark Office*